(12) United States Patent
Hollar et al.

(10) Patent No.: US 12,114,230 B2
(45) Date of Patent: Oct. 8, 2024

(54) REAL TIME TRACKING SYSTEMS IN THREE DIMENSIONS IN MULTI-STORY STRUCTURES AND RELATED METHODS AND COMPUTER PROGRAM PRODUCTS

(71) Applicant: Wiser Systems, Inc., Raleigh, NC (US)

(72) Inventors: Seth Edward-Austin Hollar, Raleigh, NC (US); Ryan Michael Tedrick, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 354 days.

(21) Appl. No.: 17/161,122

(22) Filed: Jan. 28, 2021

(65) Prior Publication Data

US 2021/0243564 A1    Aug. 5, 2021

Related U.S. Application Data

(60) Provisional application No. 62/967,678, filed on Jan. 30, 2020.

(51) Int. Cl.
*H04W 4/029* (2018.01)
*H04W 4/021* (2018.01)
*H04W 4/33* (2018.01)

(52) U.S. Cl.
CPC ........... *H04W 4/029* (2018.02); *H04W 4/021* (2013.01); *H04W 4/33* (2018.02)

(58) Field of Classification Search
CPC ......... H04W 4/029; H04W 4/02; H04W 4/80; H04W 4/023; H04W 4/021; H04W 4/026; H04W 4/33; H04W 4/027; H04W 4/38; H04W 64/006; H04W 12/63; H04W 4/025; H04W 12/61; H04W 12/64; H04W 28/0226; H04W 48/04; H04W 56/006; G01S 5/06; G01S 5/0236; G01S 19/42;
(Continued)

(56) References Cited

U.S. PATENT DOCUMENTS 9,151,822 B2    10/2015 Waite et al.
10,064,012 B1 *  8/2018 Boston .................. G01S 1/0428
(Continued)

FOREIGN PATENT DOCUMENTS

CN      107770861 A   *  3/2018
WO     2006012554 A2      2/2006
WO     2012052766 A2      4/2012

*Primary Examiner* — Nizar N Sivji
*Assistant Examiner* — Jing Gao
(74) *Attorney, Agent, or Firm* — Stanek Lemon Crouse & Meeks, PA

(57) ABSTRACT

A real time location system (RTLS) is provided for determining three-dimensional locations of nodes in an environment. The RTLS system includes at least one node associated with an asset in the environment. The at least one node has an unknown location. The system further includes at least one tracking device that communicates with the at least one node to obtain location data associated with the unknown location of the at least one node. A location module receives the location data associated with the unknown location of the at least one node and determines a real-time three-dimensional current location of the at least one node based on the location data. The real-time three-dimensional current location having x, y and z coordinates and the z coordinate indicates a height of the at least one node in the environment.

17 Claims, 26 Drawing Sheets

(58) Field of Classification Search
CPC . G01S 5/0257; G01S 5/08; G01S 5/14; G01S 5/0278
See application file for complete search history.

(56) References Cited

U.S. PATENT DOCUMENTS

| | | |
|---|---|---|
| 10,462,762 B2 | 10/2019 | Hollar |
| 2016/0088441 A1* | 3/2016 | Mohammad Mirzaei .................. H04W 40/244 370/338 |
| 2018/0241130 A1 | 8/2018 | Hollar et al. |
| 2018/0294565 A1 | 10/2018 | Hollar et al. |
| 2018/0330293 A1* | 11/2018 | Kulkarni ............ G06Q 10/0633 |
| 2020/0051007 A1* | 2/2020 | Huberman ........... G06Q 10/087 |
| 2020/0217666 A1* | 7/2020 | Zhang ................ G01C 21/3848 |

\* cited by examiner

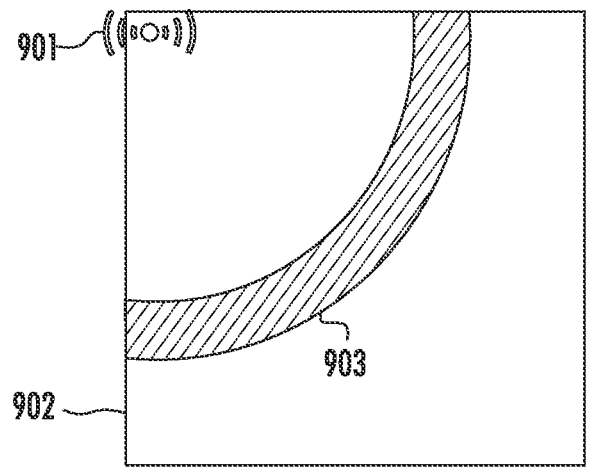
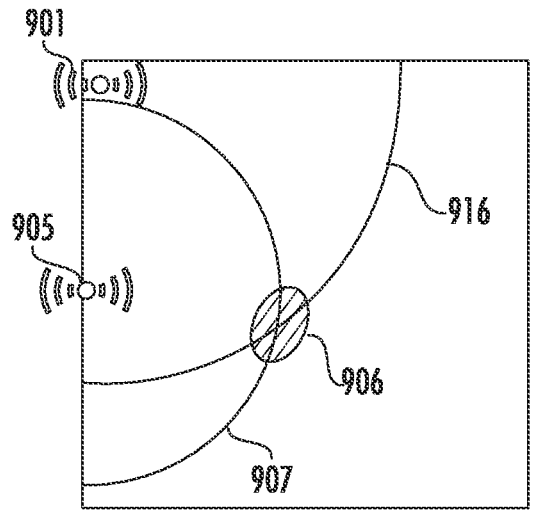
FIG. 9A
FIG. 9B
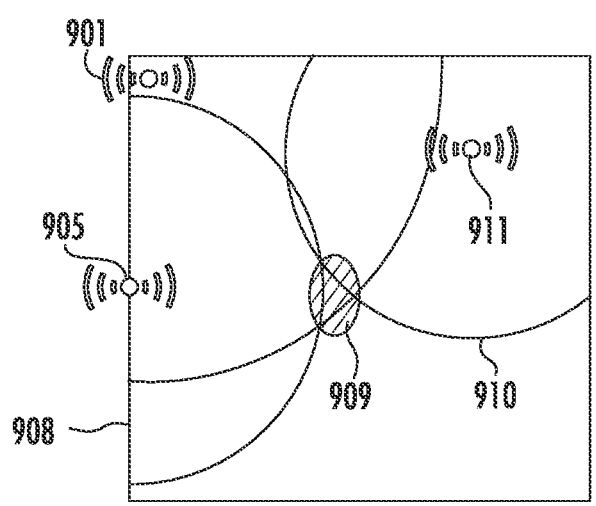
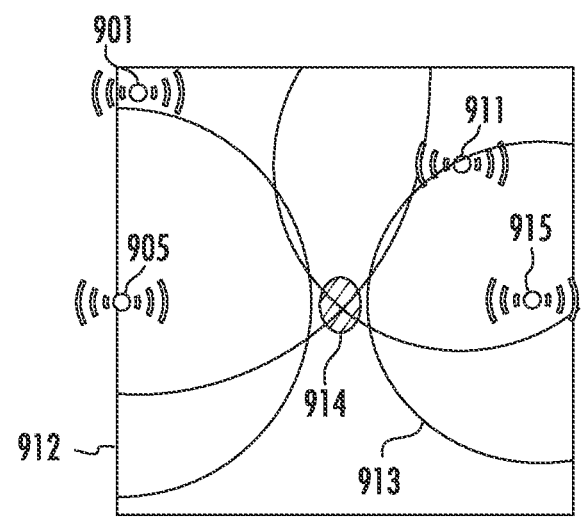
FIG. 9C
FIG. 9D

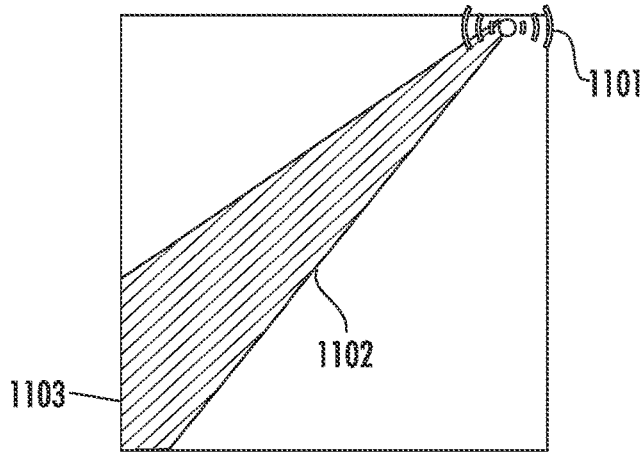
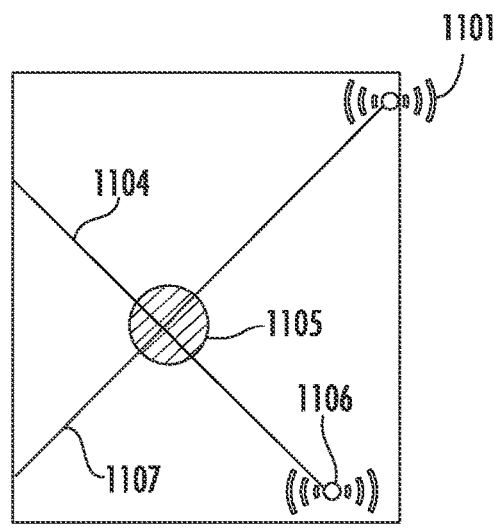
FIG. 11A
FIG. 11B
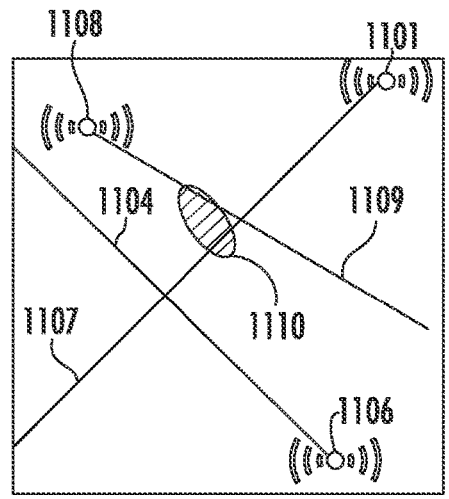
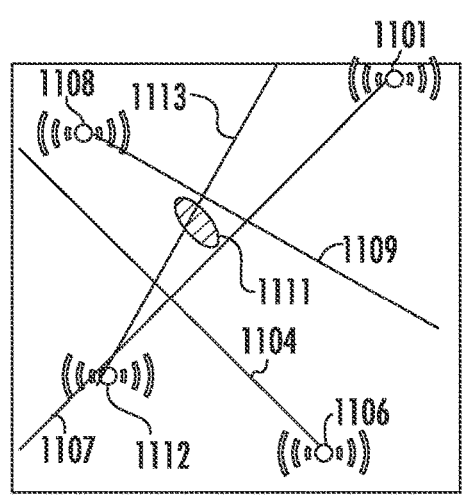
FIG. 11C
FIG. 11D

REAL TIME TRACKING SYSTEMS IN THREE DIMENSIONS IN MULTI-STORY STRUCTURES AND RELATED METHODS AND COMPUTER PROGRAM PRODUCTS

The present application claims priority to U.S. Provisional Application Ser. No. 62/967,678, filed on Jan. 30, 2020 entitled Real Time Tracking Systems in Three Dimensions in Multi-Story Structures, the contents of which is hereby incorporated herein by reference as if set forth in its entirety.

FIELD

The present inventive concept relates generally to tracking assets and, more particularly, to provided location information in three-dimensions.

BACKGROUND

Much of tracking in real-time location systems (RTLSs) has focused on identifying the location of an object on a two-dimensional map. In essence, a location of an object, asset, or tag is described in two dimensions, and the height of the tag is not really addressed. Some solutions assume an average height above the ground from which to base location calculations. This clearly has many draw backs since the location of a physical item could be changing in height during the course of its movement. Also, if just x and y values are known, the z height could potentially make a big difference in the object's location. For example, someone walking between floors of a building could be on the first floor or the second floor yet still have the same (x,y) location. Even on the same floor, a tagged item's height could impact the knowledge of where it is placed. For example, in a warehouse, the top of a 30-foot shelf is a very different location than that of the ground floor shelf beneath it.

Traditional two-dimensional (2D) tracking systems are able to determine the x and y coordinates of a tagged item assuming the item is always at a defined height above the ground. This height defines a plane that is parallel to the ground, but at a fixed distance. In reality, however, nodes may deviate from this fixed height. An example might be affixing a node into the breast pocket of the shirt of an individual. The height may be set to 4 feet, but as the person moves around, sits, down, lies down, climbs a ladder, etc., the node height will vary considerably. In 2D tracking solutions, any deviations from the expected height will result in distortions of the calculated x,y location of the node. If the height varies too much, the error of the calculation may be so large that the system cannot reliably determine the position.

SUMMARY

In some embodiments of the present inventive concept provide a real time location system (RTLS) for determining three-dimensional locations of nodes in an environment. The RTLS system includes at least one node associated with an asset in the environment. The at least one node has an unknown location. The system further includes at least one tracking device that communicates with the at least one node to obtain location data associated with the unknown location of the at least one node. A location module receives the location data associated with the unknown location of the at least one node and determines a real-time three-dimensional current location of the at least one node based on the location data. The real-time three-dimensional current location having x, y and z coordinates and the z coordinate indicates a height of the at least one node in the environment.

Related methods and computer program products are also provided.

BRIEF DESCRIPTION OF THE DRAWINGS

FIGS. 9A through 9D are diagrams illustrating various scenarios of determining location in accordance with some embodiments of the present inventive concept.

FIGS. 11A through 11D are diagrams illustrating various scenarios of determining location in accordance with some embodiments of the present inventive concept.

DETAILED DESCRIPTION

Figure 1:
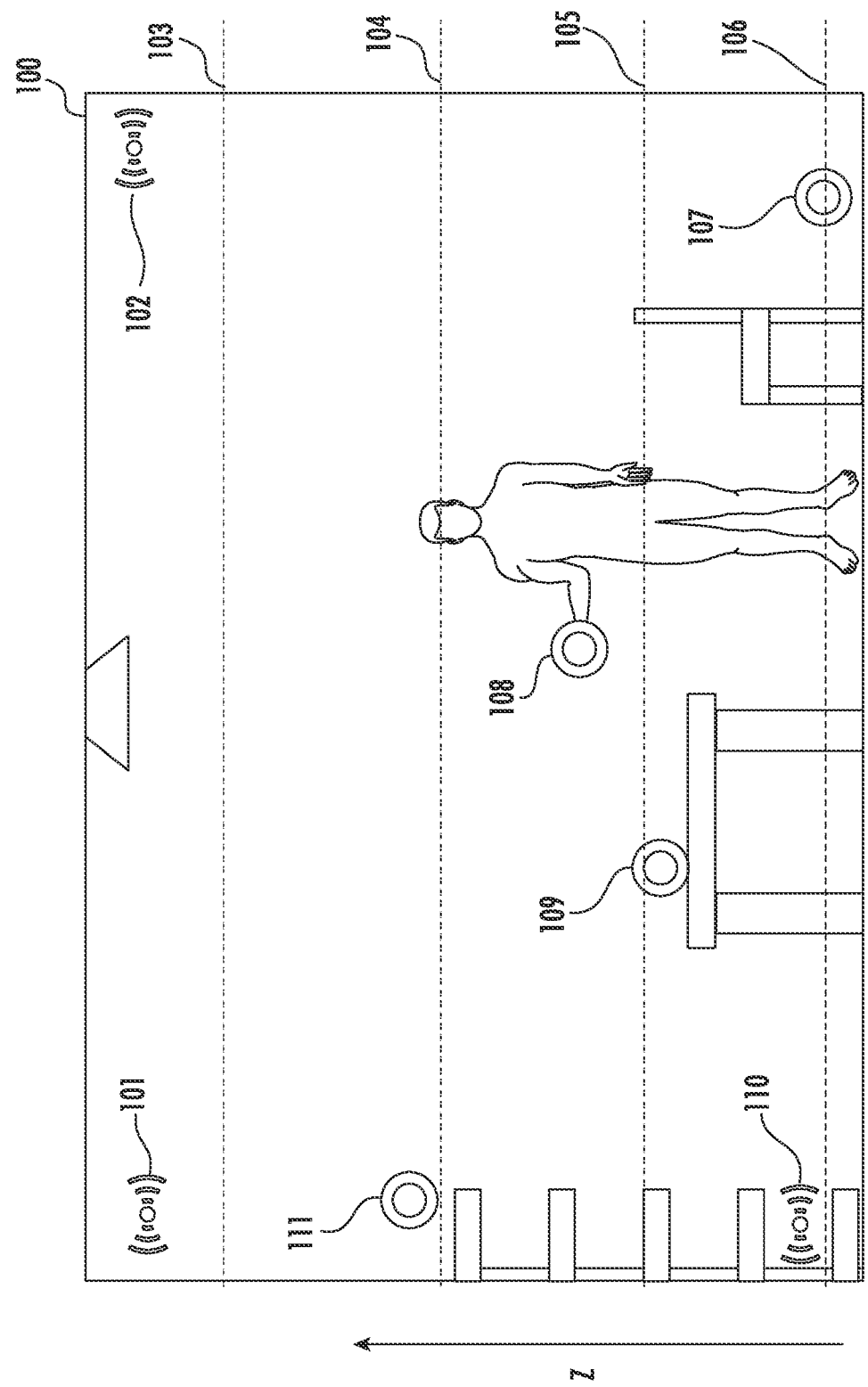
FIG. 1 is a diagram of an environment including tracking devices and nodes in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, traditional Two-dimensional (2D) tracking systems are able to determine the x and y coordinates of a tagged item assuming the item is always at a defined height above the ground. This height defines a plane that is parallel to the ground but at a fixed distance. In reality, however, nodes may deviate from this fixed height. Accordingly, embodiments of the present inventive concept provide methods for determining the z height value in a real-time location systems (RTLS) system. Furthermore, a tag's location, accuracy, and additional configuration parameters of a three dimensional (3D) system can be determined using a probabilistic method as will be discussed. The 3D solution can be displayed, for example, on graphical user interface (GUI) of a computer, which may include representation within a multi-floor structure. Calibration of the system, the associated efficacy of the system, and how that is displayed to the user are discussed further herein with respect to the figures.

As used herein, a "tag" refers to any sort of electronic active/passive label, chip, indicator etc. that can be used to track a location of an asset. Any tag may be used that provides the necessary functionality. For example, relevant tags are discussed in U.S. patent application Ser. No. 15/767, 498 entitled ULTRA-WIDEBAND (UWB) ANTENNAS AND RELATED ENCLOSURES FOR THE UWB ANTENNAS, the contents of which are hereby incorporated herein by reference as if set forth in its entirety. The term "node" may be used to describe a "tag" in some embodiments. Embodiments discussed herein are not limited to this example.

Terminology used in accordance with embodiments of the present inventive concept will be discussed. In general, nodes, tracking devices, distance measurements, arrival and departure times, and/or Angle-of-Arrival (AoA) of incoming signals are discussed throughout the present disclosure. As used herein, "nodes" generally refer to devices whose location is not known and "tracking devices" refer generally to devices whose locations are known and who gather raw location data from nodes. "Distance measurements" represent attempts to determine the "true" line-of-sight (LOS) distance between two devices. A "true LOS" refers to the distance between two devices as measured by a straight line drawn between them. Ultra-wideband (UWB) is a technology that enables distance measurements through Time-of-Flight (ToF) ranging. UWB may also include the ability to capture highly precise arrival and departure timestamps of radio frequency (RF) signals being sent between devices. Angle-of-arrival (AoA) and angle-of-departure (AoD) measurements are also possible using UWB technology.

As used herein, "nodes" are understood to be associated with "assets" begin tracked in an environment, for example, a multistory building. The assets/nodes are typically "tagged" and the tag communicates with the tracking devices to determine a three-dimensional location of the tagged asset. As used herein, "assets" refer to items or stock disposed in an environment, people or items moving around the environment and the like. The term asset may be used to refer to any item that needs to be tracked.

Although embodiments of the present inventive concept are discussed herein with respect to UWB, UWB technology is only an example. Other technologies that allow for the determination of distance, precise timestamps of signals, or angle-of-arrival or departure of signals may also be used. Furthermore, other technologies used to determine location related to this inventive concept could include RF received signal strength, ultrasound, radar, infrared, LiDAR and the like.

Calculation of three-dimensional (3D) location in an RTLS will be discussed. In RTLS, with UWB specifically, a variety of methods exist to determine the x, y, and z location of a device. For example, example methods are discussed in U.S. Pat. No. 10,462,762, the contents of which are hereby incorporated herein by reference as if set forth in their entirety. Most conventional solutions, however, have generally focused on two dimensions (x,y). Given the fine tuning of these 2D solutions, some embodiments of the inventive concept consider a layered approach to calculating a 3D solution as will be discussed with respect to FIG. 1.

Referring to FIG. 1, a diagram of an example environment, for example, a room in a building will be discussed. It will be understood that the "environment" as discussed herein may in any environment and is not limited to the specific environments discussed herein. The environment of FIG. 1 includes a room 100 in a building that includes a plurality of tracking devices 101, 102, and 110 and a plurality of nodes 107, 108, 109 and 111. The tracking devices 101, 102 and 110 are distributed throughout the room. The nodes 107, 108, 109 and 111, the locations of which may not be known, are in various locations in the room 100. The tracking devices 101, 102, and 110 collect data from the nodes 107, 108, 109 and 111 and send it to a processing unit (discussed below) of, for example, a location module, to determine the location of the nodes 107, 108, 109 and 111. In a typical 2D method, the node height (z) would be assumed. However, in some embodiments of the present inventive concept, the method calculates the location of the nodes 107, 108, 109 and 111 based on a list of heights 103, 104, 105 and 106. For each height, an x,y location of the node 107, 108, 109 and 111 is determined. For example, node 108's location will be calculated at heights of 106, 105, 104, and 103 yielding a total of four locations calculated, so the final set of solutions would be:

$$P1 = (x_1, y_1) @ \text{height } 106 \quad \text{Eqn. (1)}$$

$$P2 = (x_2, y_2) @ \text{height } 105 \quad \text{Eqn. (2)}$$

$$P3 = (x_3, y_3) @ \text{height } 104 \quad \text{Eqn. (3)}$$

$$P4 = (x_4, y_4) @ \text{height } 103 \quad \text{Eqn. (4)}$$

In addition to solving for each location (P1 thru P4), methods in accordance with embodiments discussed herein also calculate a confidence factor for each point, respectively. The confidence factor represents the degree of certainty that the calculated location is the true location. The confidence factor may be calculated from quantifying the error offsets of the raw data measurements when compared to the calculated solution. For example, the error of the system could be calculated from the difference in the measured distances versus the presumed distances between the calculated point and each of the antennas. Greater error could infer a lower confidence factor whereas a small amount of error may imply a greater confidence factor.

The point that has the largest confidence factor may be chosen as the correct location. The assumption is that the selection of height that is closest to the true node's height would give the overall highest confidence factor. Alternatively, the true node could be chosen based on the associated error being the smallest among the set of solution points, P1 thru P4. In embodiments where there are more than a few floors (levels) and calculating a solution for each floor is not feasible, tools such as binary search or gradient descent can be used to deduce the correct floor without calculating a solution for all floors.

Figure 2:
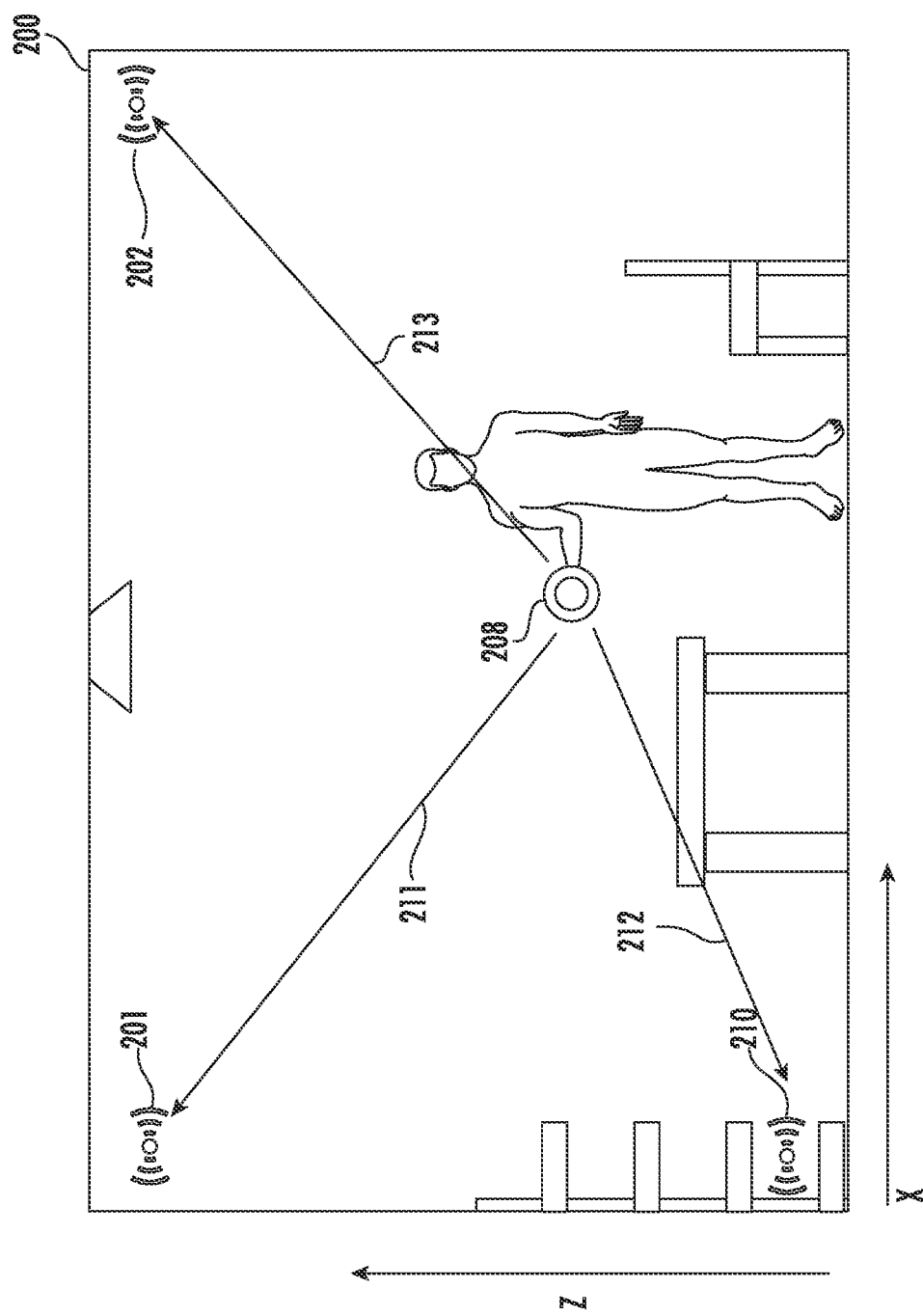
FIG. 2 is a diagram of an environment including tracking devices and a single node in accordance with some embodiments of the present inventive concept.

Referring now to FIG. 2, a diagram of an environment including tracking devices and a single node in accordance with some embodiments of the present inventive concept will be discussed. In some embodiments, the calculation of a 3D solution is very similar to that of a 2D solution. FIG. 2 illustrates a room 200 including a plurality of tracking devices 201, 202, and 210 and a single node 208. Node data is communicated to the tracking devices 201, 202 and 210. The node data may be in the form of AoA, ToF, arrival timestamp measurements and the like. Typically, 2D solutions have a 2D map with tracking devices' locations overlaid on top of them. The specific placement of the tracking devices within the x, y plane can often have a significant impact on the accuracy of the location system in x and y. In some embodiments of the present inventive concept, the y axis is replaced with the z axis. In this scenario, the Z height is solved for, albeit at the sacrifice of now solving in the y axis. In many application scenarios, however, this may be useful. Alternatively, a layered approach as discussed above with respect to FIG. 1 may be used, but where instead of having a discrete set of z values, there is a discrete set of y values 211, 212 and 213, and the method is configured to solve for x and z at each of the y values. This method could be useful in many instances. For example, it could be useful where the range of tracking in the y axis is relatively narrow. Examples could include tracking items on scaffolding, tracking workers washing windows of tall buildings, or inventory of items with shelves all on a single wall. It could also be useful when the accuracy of the nodes in the y-axis does not need to be precise or is augmented by additional information. Examples of this could include "lanes" where vehicles are required to stay in their lane.

In some embodiments, tracking devices can be placed on multiple floors of the structure in which real time location tracking is desired. These nodes may be placed on all floors of the structure, or every several floors depending on the permeability of the structure. As in the layered approach discussed with respect to FIG. 1, each node or set of nodes has one or more planes in which the method may determine the location, depending on how many floors are between nodes. For example, if each floor of the structure has tracking devices, each node will have a single plane in which it will attempt to position nodes. Thus, for each floor, the nodes will likely be at some expected height off the floor. If tracking nodes are positioned on every other floor of the structure, then each node will have two planes in which it will attempt to perform location calculations, with a fixed height for each of the floors.

Figure 3:
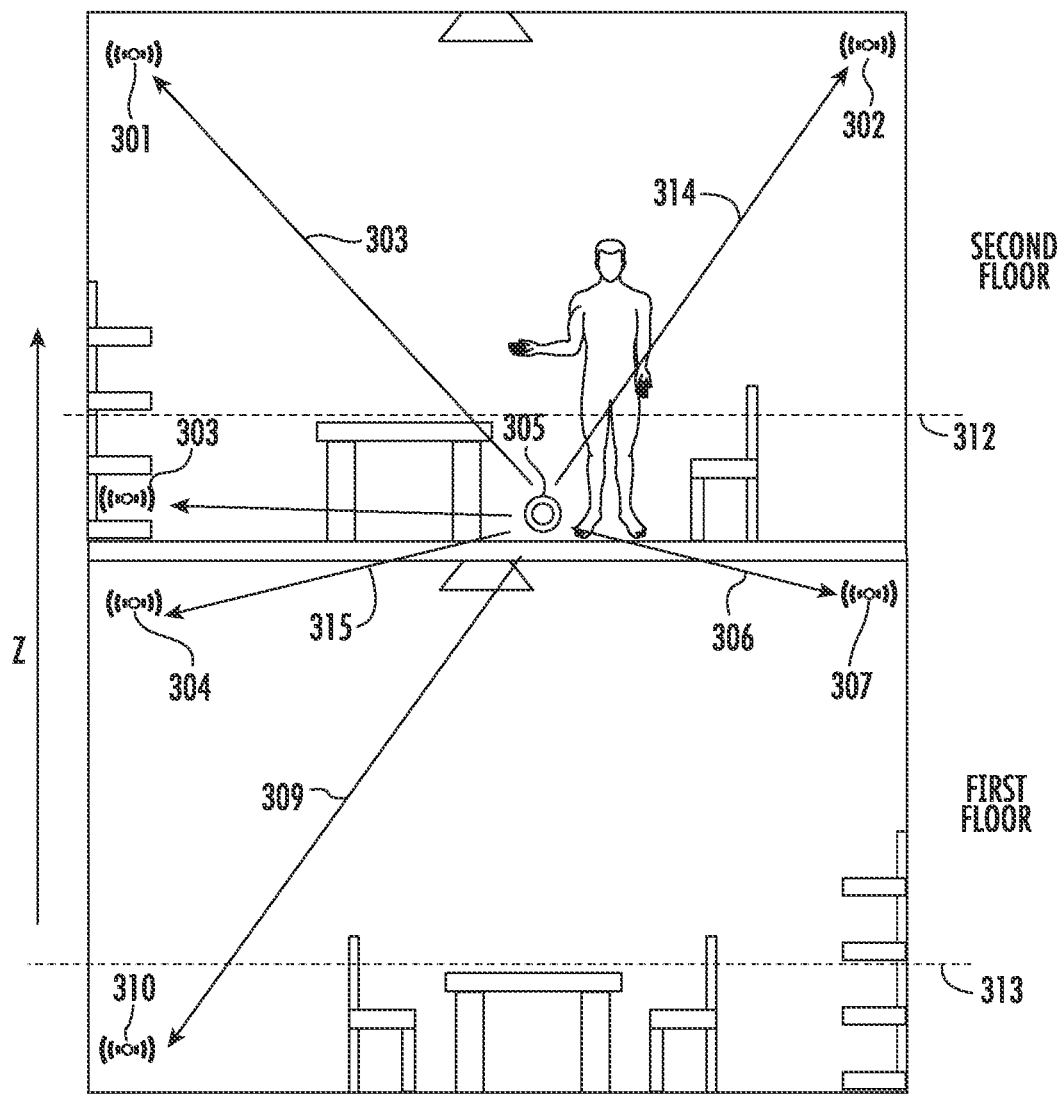
FIG. 3 is a diagram of a multi-story environment including tracking devices and a single node in accordance with some embodiments of the present inventive concept.

Referring now to FIG. 3, a multistory environment including a plurality of tracking devices and a single node in accordance with some embodiments of the present inventive concept will be discussed. As illustrated in FIG. 3, a two story structure includes a plurality of tracking devices 301, 302, 303, 304, 307, and 310 that all gather data from a single node 305. Furthermore, z value heights at 312 and 313 are used to solve for two scenarios of z height. Again, in FIG. 3, there is a discrete set of y values 303, 306, 309, 314 and 315, and the method is configured to solve for x and z at each of the y values. As discussed above, the confidence factors may be used to determine the best choice of the two calculated locations of the node, but since each height refers to a floor, the system is effectively determining the correct floor the tag is on.

Figure 4:
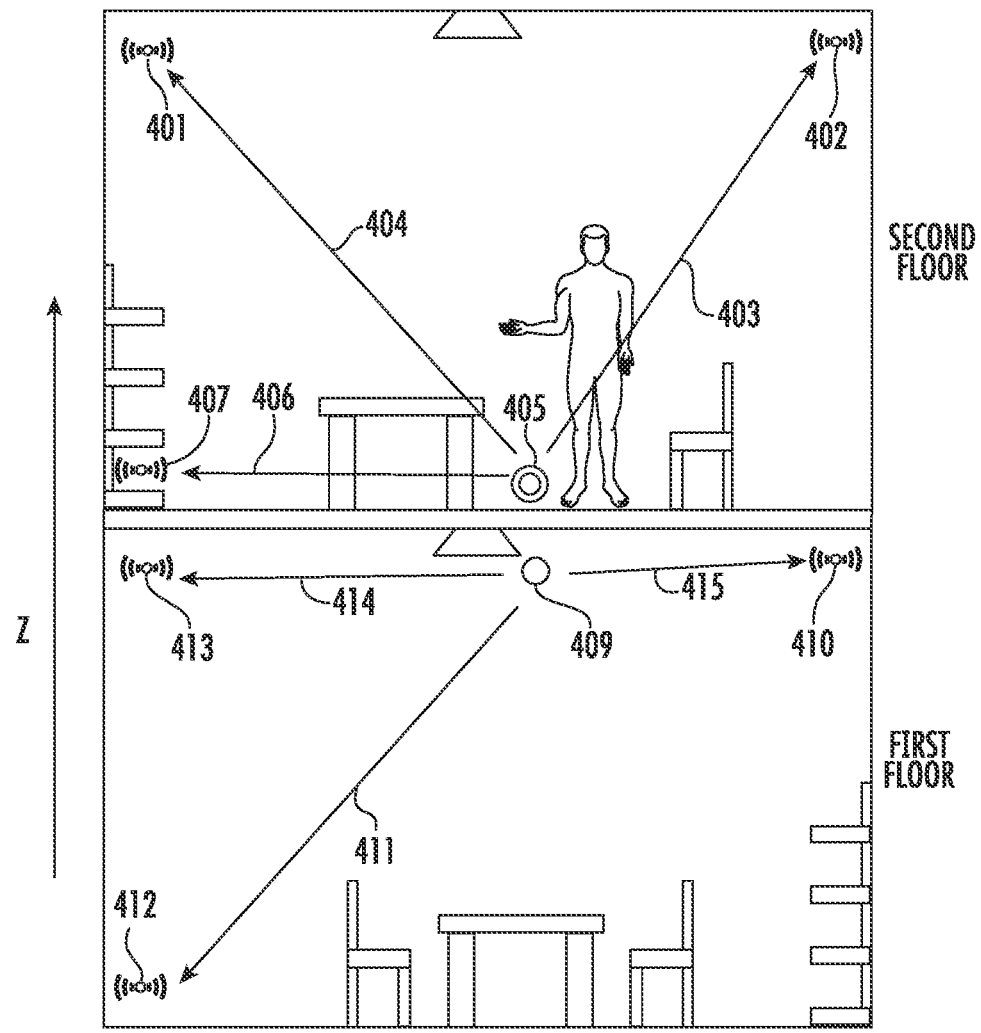
FIG. 4 is a diagram of a multi-story environment including tracking devices and a single node having a true location and a ghost location in accordance with some embodiments of the present inventive concept.

In some embodiments, however, the confidence factor is not the only information needed in selecting the true location. FIG. 4 illustrates a multistory environment where a node had more than one location, a ghost location and a true location. As illustrated in FIG. 4, each of the floors has separate tracking device mesh networks. As used herein, a "mesh network" refers to a local network topology in which the infrastructure nodes (i.e. bridges, switches, and other infrastructure devices) connect directly, dynamically and non-hierarchically to as many other nodes as possible and cooperate with one another to efficiently route data from/to clients. More simply, a mesh network is a group of RF capable devices that can communicate with one another either directly or indirectly to efficiently route data and perform localization tasks.

In embodiments illustrated in FIG. 4, the z height calculation may or may not use a layered approach for determining the 3D location. The second floor uses tracking devices, 401, 402, and 407 to determine the location of node 405. The first floor uses tracking devices 413, 410, and 412 and determines that node 405 is located at position 409. The result is that two locations were calculated but one location is the "true" location of the node 405 and the other location is a "ghost" location 409. Again, distances 404, 403, 406, 411, 414 and 415 are used to solve for the other values. Furthermore, these two solutions are close in proximity, so their confidence factors are nearly the same, not necessarily allowing one location to be chosen over another. Even though the locations are nearly the same, the results show the node on two completely different floors. This could have adverse consequences in understanding the motion of node 405. This scenario is not uncommon since the boundary between two floors/rooms/zones may show edge case scenarios where a set of node locations are calculated which are similar in value but represent very distinct locations (on one floor or another, in a room or not, in zone or not).

Figure 5:
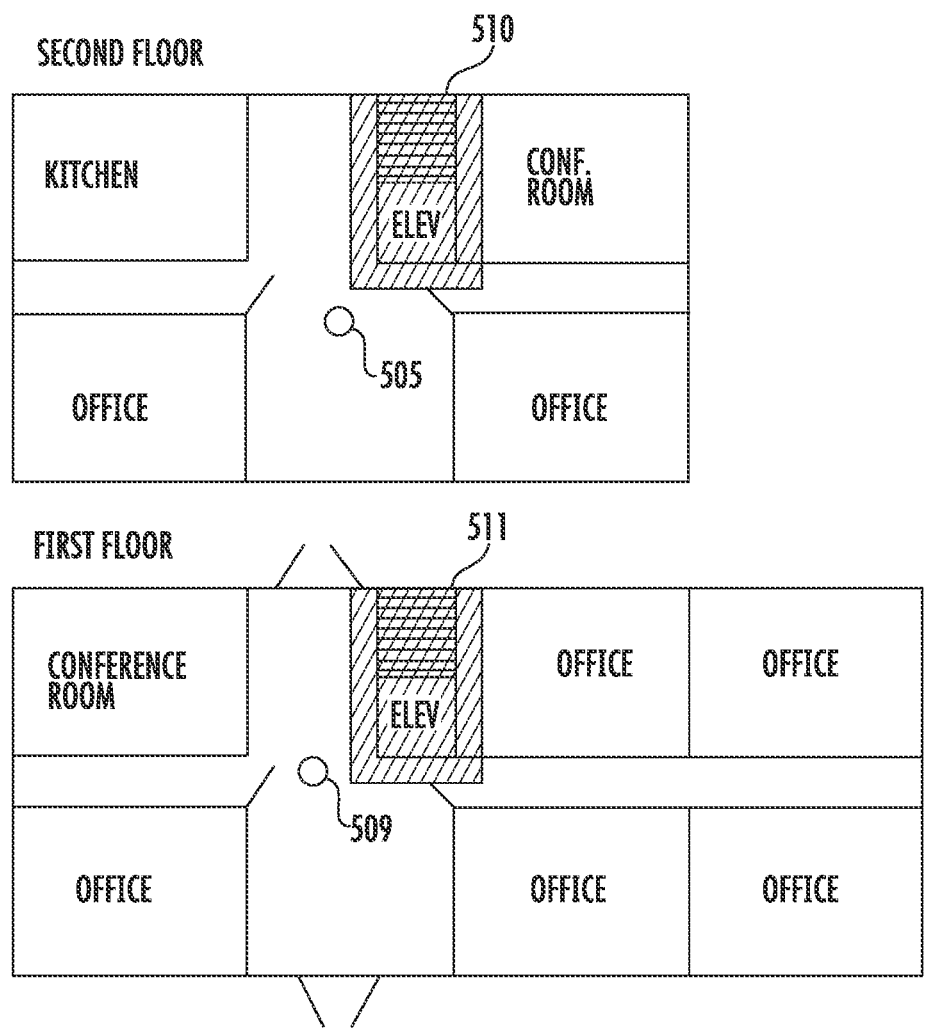
FIG. 5 is a diagram of a two-dimensional (2D) map of the first and second floors of the multi-story environment of FIG. 4 in accordance with some embodiments of the present inventive concept.

Referring now to FIG. 5, an alternate view of FIG. 4 will be discussed. As illustrated in FIG. 5, node 505 is shown in an x,y map depiction of the second floor, while its ghost image node 509 is shown nearly in the same location but on the first floor. If two meshes are being run simultaneously, this effect could be detected by noting that the node shows up simultaneously in two different locations. In some embodiments, the last known location of the node can be leveraged to infer any new points that are calculated. Consider the transition zones 511 and 510 in FIG. 5, for example, the stairwells in FIG. 5. However, it will be understood that transition zones 510 and 511 cover all types of transitions zones including an elevator and a stairwell of the building. Conceivably, this is the only location where nodes could physically move between the first and second floors. Assuming, for example, that the node 505 is on the second floor initially. It is expected that the node 505 still remains on the second floor since it cannot move instantaneously to the first floor without being in the transition zone. Therefore, the shadow position 509 could be eliminated, and node 505 may be considered the true location.

Figure 6:
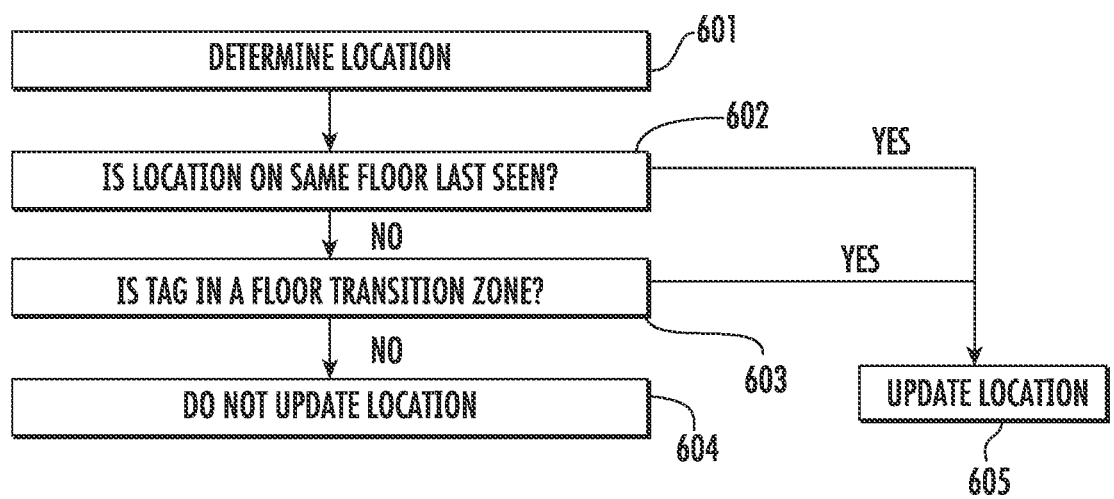
FIG. 6 is a flowchart illustrating operations for determining the true location of a node in accordance with some embodiments of the present inventive concept.

Referring now to the flowchart of FIG. 6, operations of FIG. 5 will be discussed. As illustrated in FIG. 6, operations begin at block 601 by determining the location of the node. The floor of the calculated location is compared to the floor of the last known location (block 602). If these locations are on the same floor, the location is updated (block 605). If the locations are not on the same floor (block 602), operations proceed to block 603 by checking to see if the node/tag is in a floor transition zone. If the node/tag is determined to be in a transition zone, then the location is updated (block 605). If the node is determined not to be in a transition zone, then the location is not updated (block 604). It will be understood that it takes time to go from one floor to the next and the update period of the node. If time between node updates is too large, this method may no longer work. In embodiments such as those, comparing the x,y position of the node could be used to assist in determining if a floor transition occurred or if the calculated location is a ghost location. For example at some time t1 the node is seen as being at point x1, $y_1$ on floor 2. Some period of time elapses before the next update from the node. On the next update at time t2 the node is seen at being point x2, $y_2$ on floor 1. If, for example, the distance traveled between the two datapoints along with switching floors is greater than what is considered a reasonable time (within some error margin), it could be determined that the floor transition was calculated in error and that the likely location of the node is still on floor 1.

As discussed above, calculated points may be disregarded if they were not on the same floor as the last known point. This can be generalized further. Points can also be disregarded depending on physical factors of the situation. For example, one physical limit to contend with involves the potential of jitter in the calculations. "Jitter" refers to node locations that seem to hop around its physical location due to error in the measurements and calculations. In some embodiments, however, errant points may hop so far away that it is a physical impossibility for the node to travel so quickly. For example, consider a person carrying a node. The person has a maximum speed of 5.0 meters per second. The location system shows in one instant that the person is at one location, and then 1.0 second later they are 10 meters away. This would be a physical implausibility since the person could not possibly travel 10 meters in one second. These embodiments will be discussed further with respect to FIGS. 7A and 7B below.

Figure 7A:
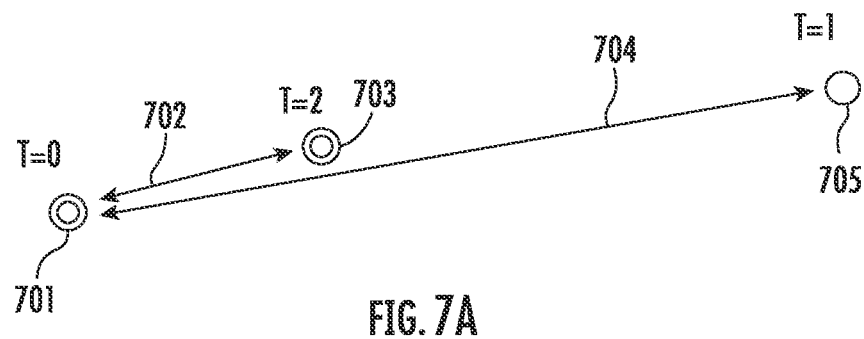
FIG. 7A is a diagram illustrating a location node at various times in accordance with some embodiments of the present inventive concept.

FIG. 7A illustrates a node location at t=0 is 701. At t=1, the calculated location is at 705, but the distance 704 therebetween is implausibly long. The system may disregard the location. At t=2, the node location is at 703. Given the passing of 2 time units, the distance 702 between 701 and 703 may be considered reasonable and, thus, the location 703 is considered valid.

Figure 7B:
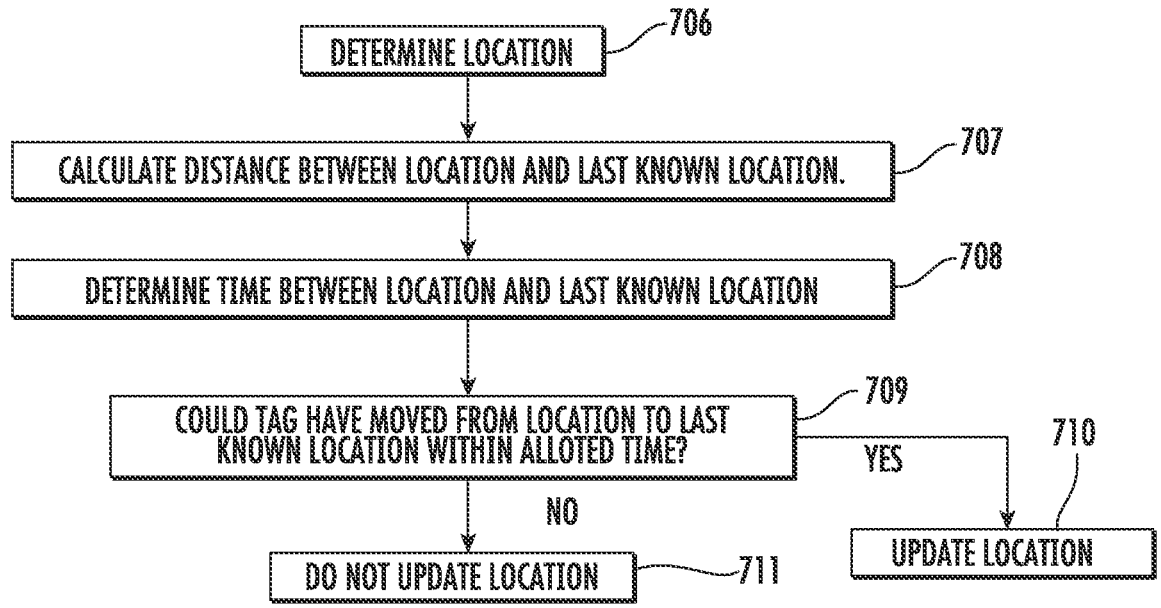
FIG. 7B is a flowchart illustrating operations of FIG. 7A in accordance with some embodiments of the present inventive concept.

Operations illustrating aspects of the present inventive concept illustrated in FIG. 7A will now be discussed with respect to the flowchart of FIG. 7B. As illustrated in FIG. 7B, operations begin at block 706 by determining a location of the node. The distance between the calculated location and the last location is calculated (block 707). A time between the presence of the node at the first location and the newly calculated location is determined (block 708). If it is determined that the node could have moved between the two locations in the calculated time period, the location of the node may be updated (block 710). If, on the other hand, it is determined that the node could not have possibly traveled the distance in that time period, the location is not updated (block 711). This method may also be applied to the floor ghosting scenario discussed above with respect to FIGS. 4 and 5. In these embodiments, the system considers whether enough time has transpired for the node to go from one floor to another. If not, then the calculated node location may be disregarded and, if so, then the node location and associated floor may be updated.

Although examples are discussed herein using the last known location as a point of comparison, additional embodiments can consider both past and future point locations to retroactively add or remove calculated locations as well without departing from the scope of the present inventive concept.

Multiple factors may be considered when determine valid locations. In some scenarios, the generation of invalid points may be a by-product of the method used to calculate location. For example, in the layered approach (e.g., FIG. 1), multiple points are calculated with differing z height values. In the example of FIG. 4, two mesh networks are operating in close proximity to one another generating points on separate floors. In considering which points are valid, the system can use a variety of factors including, but not limited to: 1) the confidence factor of the calculated location; 2) last known floor locations; and 3) the physical feasibility for the tag to travel between two point locations. As more information becomes available regarding node/tag motion, patterns and behavior of the node/tag could also be incorporated to determine valid location points.

Representation of distance measurements with probability distribution functions will now be discussed. In order to solve for the location of nodes, tracking devices obtain raw location data from nodes. This raw location data can come in the form of, for example, 1) distances between devices and/or nodes; 2) measurement of the angle of arrival of an impending signal; or 3) precise time capture of arrival and departure messages. The accuracy of each one of these measurements, however, is limited by the implementation, the communicating medium, and potentially other factors which can add uncertainty to the measurement. According to some embodiments of the present inventive concept, the measurement is modeled as a probability density function (PDF) of the actual measurement.

Figure 8:
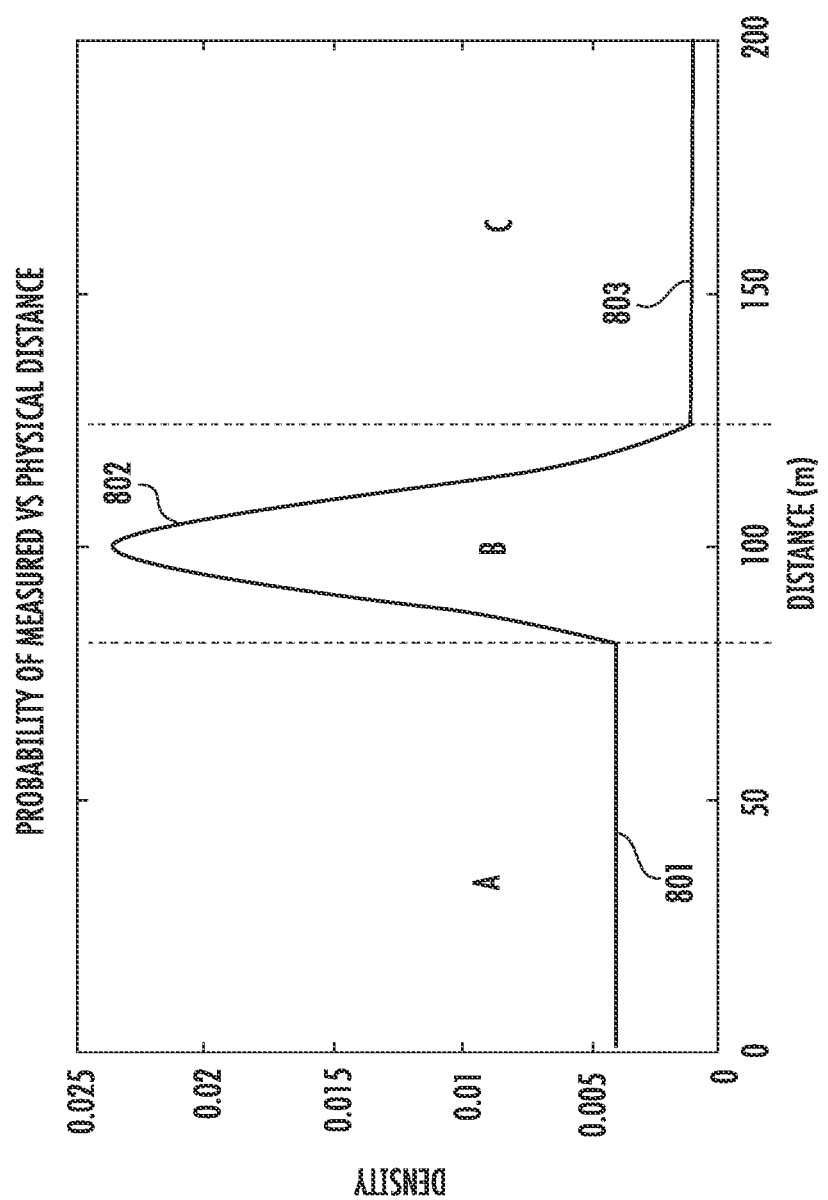
FIG. 8 is a diagram illustrating probability density of measured versus physical distance in accordance with some embodiments of the present inventive concept.

Referring to FIG. 8, the probability density function (PDF) of a measured distance between two devices will be discussed. As illustrated, the measured distance is read as 100 meters (m), but instead of assuming that the measured distance is the true physical distance, the system models the measurement as a PDF where the x axis represents the actual physical distance and the y axis represents the associated probability density. This PDF can be broken up into three sections: A, B, and C. In B, the model is a Gaussian distribution 802 with a peak at 100 m, the measured distance. This makes sense as one would expect the highest probability of the physical distance to be at the measured distance. Unlike a normal Gaussian distribution which trails off to zero over greater distances from the center, this PDF transitions into two different sections, A and C. Considering UWB ranging technologies, ranging errors can occur if the direct line of sight of an RF signal is blocked, reflections of the RF signal can also distort the measured distance and make it appear that the measured distance is farther away than the real distance. Without the ability to rule out reflections, it can be assumed that a relatively constant or near constant probability distribution 801 accounts for reflections. In performing ranging, it may also be the case that the internal method for determining distance and timing may produce erratic results. This could happen in the case of a noisy RF environment or with surrounding spurious emissions which may smear the arrival time of the message.

Though rare, it is not unforeseen that measured distances may turn out to be shorter than the real physical distance. This is illustrated in section C of FIG. 8 where the line 803 describes the relatively low probability density of this occurring. For example, if the true distance were 150 m, but the measurement showed 100 m, this effect could not be due to reflections. This phenomenon deals more with the error associated with the method of measuring the distance. Alternatively, intentional interference or RF spoofing could make it seem that the node is closer than it actually is.

FIG. 8 illustrates a single example of a PDF for distance measurements. This same methodology of applying probability distribution functions to arrival timestamps and AoA measurements is also possible. Furthermore, though the three sections A, B, and C describe probabilities 801, 802, and 803, respectively, as constant and Gaussian distributions, many other distribution curves can be applied including but not limited to step functions, linear curves, polynomial curves, Rayleigh curves, and the like. In some embodiments, sections A, B, and C each represent constant step functions. Given this, the calculation of probabilities becomes much less computationally expensive considering the calculation can simply be multiplying constants. With the calculation of locations involving evaluating the PDF of multiple devices at multiple locations, it can be important to reduce computational load by simplifying the mathematics.

With modeling of the PDF of a measurement, one can rethink how a solution to a 2D or 3D location is calculated as well. Typically, location can be determined by performing a calculation to yield a single point in space. In these embodiments of the inventive concept, however, a location method is provided that creates spatial PDF. Namely, the location of a point is described by a 2D or 3D probability density function.

Referring now to FIG. 9A, a 2D space 902 is shown with a single antenna 901 ranging to a node (not shown). The measured distance between the antenna 901 and node produce a PDF much like in FIG. 8. Spatially speaking, one can calculate the probability of the node being at that point for each and every point within the space 902. The resulting 2D spatial image is shown with a dark band 903 as a circular arc. This arc represents the area of high probability where the node might be located. This makes sense for a single distance measurement as the location of the node would be anywhere along the perimeter of a circle whose center is at tracking device 901 and whose radius would represent the measured distance to the node. As a spatial PDF, the thick band represents the uncertainty of the location.

FIG. 9B introduces a new tracking device (antenna) 905 in addition to the existing tracking device 901. The two distance measurements are displayed graphically as circles (907 and 916) whose radii are the measured distance. The dark area 906 on the spatial PDF of FIG. 9B represents higher probability of the location of the device. As opposed to the dark band 903 about the perimeter of the circle in FIG. 9A, the area of high probability 906 is near the intersection of the two circles 916 and 907. Mathematically, the spatial PDF can be calculated as the product of the individual distance PDF's for each point (x,y):

$$PDF_{spatial}(\text{point}) = PDF_{dev1}(\text{distance1}(\text{point})) \\ * PDF_{dev2}(\text{distance2}(\text{point})) \qquad \text{Eqn. (5)}$$

where distance1(point) is the distance of a point to the tracking device 901; distance2(point) is the distance of a point to the tracking device 905; and $PDF_{devx}$ represents the probability distribution function of measured distance versus actual physical distance for tracking device x.

In FIG. 9C an additional tracking device 911 is added to the space 908 with an associated distance as outlined by the circle 910. The area of high probability 909 is further refined with the product of the third PDF. To generalize, the spatial PDF is the product of all the individual distance PDF's for each point (x,y):

$$PDF_{spatial}(\text{point}) = \Pi PDF_{dev-i}(\text{distance-}i(\text{point})) \qquad \text{Eqn. (6)}$$

Where $PDF_{dev-i}$ refers to the PDF of the $i^{th}$ tracking device and distance-i refers to the distance from the point to the $i^{th}$ tracking device.

Similarly, in FIG. 9D the addition of a fourth tracking device 915 with distance as outlined by the circle 913 causes the area of high probability 914 to be determined by the product of the four distance PDFs to yield the final spatial PDF graphically depicted in the space 912. Note that the area of high probability lies outside the circles of 913 and 907. This area may fall within the section C of the distance PDF for tracking devices 915 and 905 as shown in FIG. 8 but still yields the most likely location for the node.

Unlike some location modules in other systems that cannot resolve solutions whose physical distances are outside the measured distances to the tracking devices, location modules in accordance with embodiments of the present inventive concept can determine an area of high probability regardless.

The center of an area of high probability can be considered a solution "point" to the location calculation. The spread of the area of the high probability can be referred to the point's level of accuracy. One can integrate over the area of high probability to get an absolute probability overall. If the probability is a high value, there is more confidence that this yields a true location, but on the other hand, if the value is small, there is less confidence that the calculated location is a true location. As discussed above, the confidence factor of a point indicates the probability that the location is a true location.

There may be multiple discrete areas of high probability for a single spatial PDF. In these embodiments, the outcome is not a single location point with a spread and confidence level, but instead it becomes a list of possible points, each one with a spread (i.e. range) and confidence level. As discussed above in accordance with some embodiments of the present inventive concept, embodiments discuss methods for resolving which point represents the true location.

In the case of a 3D space, there is no loss in methodology compared to the 2D example. The spatial PDF is a volume instead of an area. Circles on a 2D spatial PDF appear as spheres, etc. Instead of referring to the area of high probability, one can refer to the volume of high probability. To determine a point with a spread and confidence level involves finding the center of a 3D volume and integrating over the volume to determine the probability and hence the confidence level.

Figure 10:
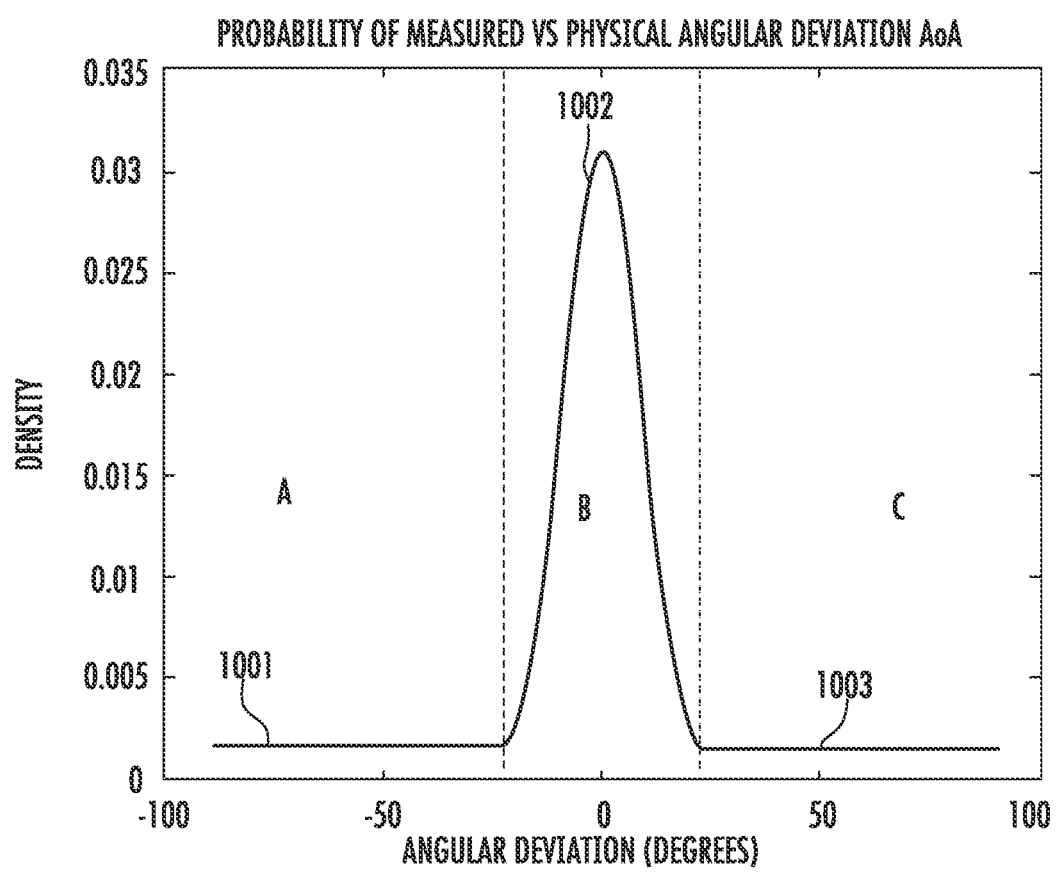
FIG. 10 is a diagram illustrating a probability density of measured versus physical angular deviation for true angle of arrival in accordance with some embodiments of the present inventive concept.

Embodiments including angle-of-arrival probability distributions will now be discussed. In FIGS. 8 through 9D, a distance PDF was discussed, but the method of creating spatial PDFs from raw data also applies to Angle-of-Arrival (AoA) and TDOA measurements. FIG. 10 illustrates an example PDF of angular deviation for measured versus true angle of arrival. Like in FIG. 8, there are three sections, A, B, and C, referring to different parts of the PDF. Section B in this example is a Gaussian distribution 1002 where the peak is at 0 degrees, suggesting that the true "LOS" angle mostly occurs at or near the measured angle. Sections A and C represent gross errors of the AoA calculation, and their PDFs 1001 and 1003 are represented by small constant values. Alternatively, gross error may come from the "LOS" signal being blocked, and hence, the AoA measurement is from a reflected RF signal. Other embodiments can have different curve representations to better model the individual AoA of systems. In a 3D example, the AoA PDF may use two angles, yaw and pitch, representing the spatial angular direction of a signal arrival. For the 3D case, the PDF could be a 2D model, with yaw as one variable and pitch as another.

FIGS. 11A through 11D illustrate the spatial PDF from a number of tracking devices doing AoA on a node in a space 1103. FIG. 11A illustrates the spatial PDF of just one tracking device 1101. The resulting area of high probability would be, as expected, a triangle in 2 dimensions or a cone in 3 dimensions 1102 with the apex emitting from the tracking device 1101 in the direction of the arrival angle.

FIG. 11B adds AoA data from another tracking device 1106. Here, the two AoA measurements are represented by straight lines 1104 and 1107 in the direction of the AoA measurements. These lines are indicative of the angles of greatest probability from their respective tracking devices. Their intersection, as would be expected, is the area of high probability denoted by 1105.

FIG. 11C adds yet another AoA tracking device 1108 with associated measured AoA direction of 1109. The area of high probability 1110 is the product of all three spatial PDFs of the individual measurements. Lastly, FIG. 11D includes a fourth tracking antenna 1112 with the associated AoA direction of 1113. The resulting area of high probability 1111 is the result of all four AoA tracking device measurements. Note that it is not necessary for the solution to reside at the intersection of the AoA lines. Instead, the location is the center of the area of high probability in the spatial PDF which, in turn, is the product of the individual AoA PDFs.

Figure 12:
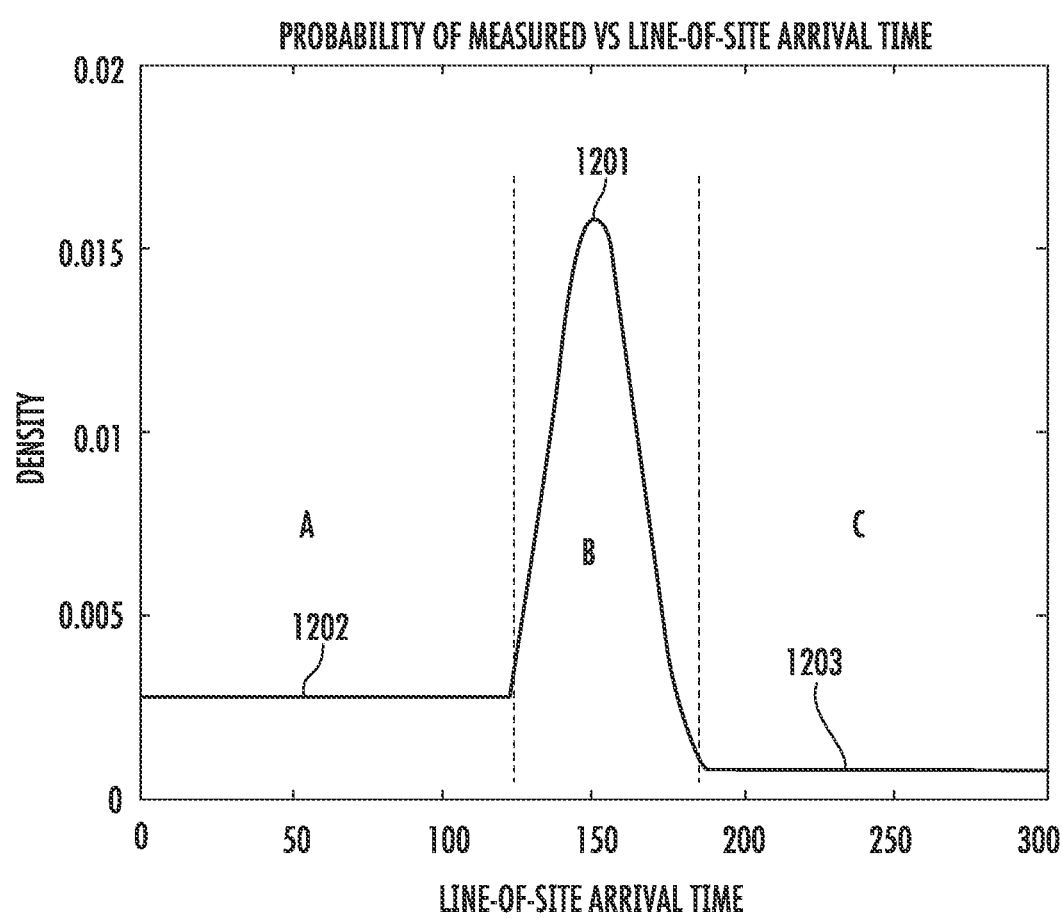
FIG. 12 is a diagram illustrating a probability density of measured versus line of sight arrival time in accordance with some embodiments of the present inventive concept.

Time of arrival probability distributions in accordance with various embodiments of the present inventive concept will be discussed. FIGS. 8 and 10 show the raw data PDFs for both distance and AoA measurements. FIG. 12 follows and illustrates the PDF of arrival time measurements. Time of arrival measurements relate to Time difference of arrival (TDOA) based solutions for localization. In essence, a node sends out an RF signal, and synchronized tracking devices will each capture an arrival time. The resulting arrival times are compared to one another to ultimately deduce the node's location. This is done in the absence of knowing what the departure time of the RF signal from the node is.

As illustrated in FIG. 12, the x axis represents an "LOS" arrival time. Effectively, this is what the arrival time would have been had there been an unobstructed LOS path between the two devices/nodes. This measured time is denoted by the peak at 1201. Unlike the LOS arrival time, in cases where only the reflected signal arrives, the arrival time would occur later than the "LOS" arrival time. When receiving an arrival time however, we do not know if the signal was LOS or reflected. So, the probability density function is constructed to account for this associated uncertainty. Note that section A's probability represents the case where the LOS arrival time occurs earlier than the measured arrival time 1201. The primary contributor to this difference could be that the reflected wave represents the measured arrival time which represents a longer path traveled and hence a later arrival time. In section C, on the other hand, 1203, is typically smaller in value than 1202, since this cannot represent reflected signals. Instead, errors in measurement or noisy RF environments may be contributors here. In equation form, the PDF is represented as:

$$\text{probability} = PDF_{arrival}(\text{Tarrival}) \qquad \text{Eqn. (7)}$$

The arrival time PDF could further be influenced by additional factors and does not necessarily have to represent the example plot in FIG. 12. For example, signal strength or components of signal strength could be incorporated as additional parameters to help shape the PDF curve.

To apply the arrival time PDF to a spatial probability, the first step is to understand that the departure time of the node's emitted RF signal is considered an unknown variable, much like the x, y, z coordinates are unknown. The arrival time PDF can be transformed into a distance PDF understanding that distance is the product of time and speed:

$$\text{distance} = (T_{arrival} - T_{depart}) * c \qquad \text{Eqn. (8)}$$

where c is the speed of the signal through the medium. Isolating $T_{arrival}$ gives:

$$T_{arrival} = \text{distance}/C + T_{depart} \qquad \text{Eqn. (9)}$$

Substituting into Eqn. (9) into Eqn. (7) yields a function that depends on distance and $T_{depart}$:

$$\text{probability} = PDF_{arrival}(\text{distance}/C + T_{depart})$$

Now, the probability PDF can be described as a function of distance and $T_{depart}$. Essentially, the space of x,y,z, and $T_{depart}$ are explored for the area of high probability. This is illustrated in FIGS. 13A through 13D.

Figure 13A:
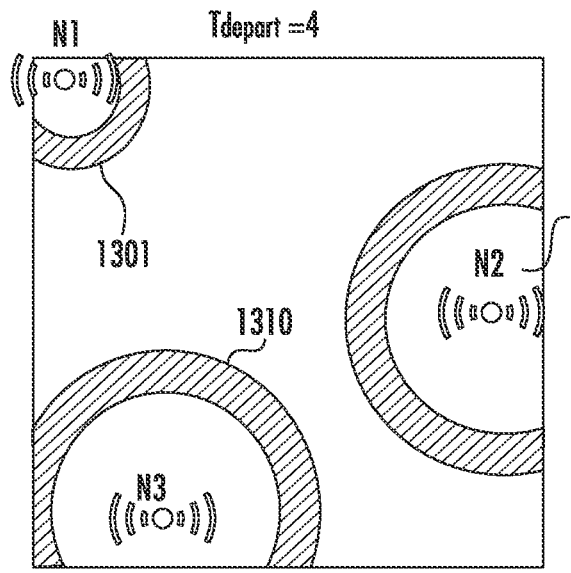
FIGS. 13A through 13D are diagrams illustrating various scenarios of determining location in accordance with some embodiments of the present inventive concept.

Each of these figures shows an example for a fixed $T_{depart}$ value. Note for each of FIGS. 13A through 13D, the magnitude of individual spatial PDF's are scaled to the maximum of the probability density for each graph. Hence, hatched areas representing areas of high probability have different scales so one can only compare within a figure but not from figure to figure. In FIG. 13A, $T_{depart}$=4 time units. With $T_{depart}$ as a fixed value, the $PDF_{arrival}$ is now a function of just distance, so the spatial PDF can be readily calculated. In these embodiments, the spatial PDF creates areas of high probability with three non-intersecting circles 1301, 1302 and 1310 with respect to nodes N1, N2 and N3, respectively. With none of the circles intersecting the maximum probability density is very low. In FIG. 13A, it is likely that the chosen $T_{depart}$ value is too large and that the true $T_{depart}$ happened earlier in time.

Figure 13B:
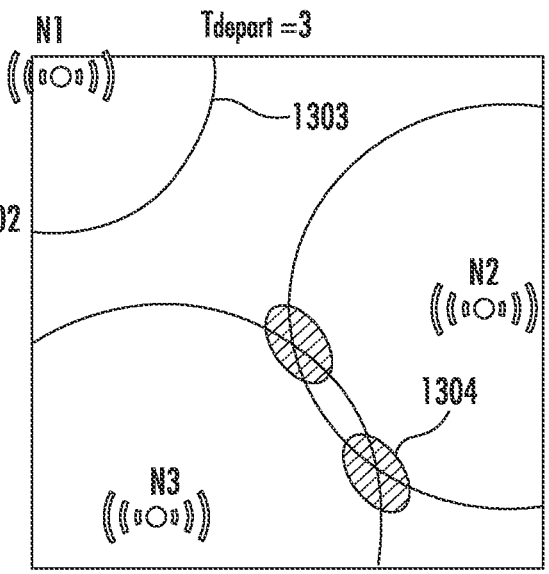

In FIG. 13B, the departure time is set one unit of time backwards, 3. Hence, the distance value is expected to be larger than in FIG. 13A, and now two of the circles intersect creating two areas 1304 of high probability and non-intersecting circle 1303. As a reminder, the magnitude of individual spatial PDF's are scaled to the maximum of the probability density for each graph. So, even though the probability densities of 1301 and 1304 are both areas of high probability within their respective graphs, in this example, the calculated probability density of 1304 is 50 times larger than in 1301.

Figure 13C:
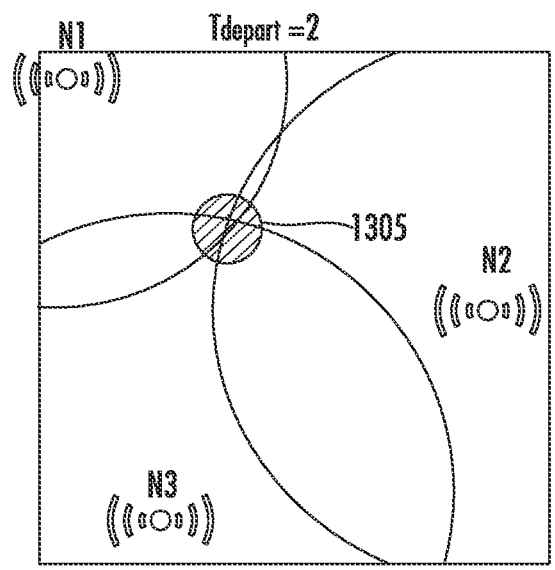
Figure 13D:
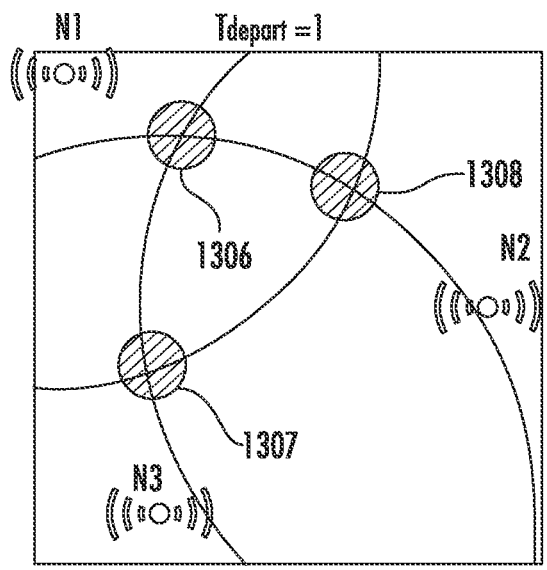

Again, stepping back one time unit for $T_{depart}$=2 in FIG. 13C, the circles become larger, almost intersecting at the area of high probability 1305. With all three circles intersecting, 1305 represents a much higher probability (40×) than the preceding area of 1304 in FIG. 13B. Lastly, taking a final time step back for $T_{depart}$=1 in FIG. 13D, the circles no longer intersect at a single point. Three separate areas of high probability (1306, 1308, and 1307) are shown, and these areas of probability are about 8 times less than that of 1305's *FIG. 13C) area of high probability.

As opposed to ranging where distance stays static as in FIGS. 9A through 9D, spatial PDFs for the raw data of time of arrival first get converted into distance PDFs with an input variable of $T_{depart}$. As shown in this example, the distances denoted by the radii of the circles fluctuate based on the value of $T_{depart}$. As a next step in the location calculation, the spatial/time space may be evaluated for areas of high probability. Those areas of high probability are then averaged to produce point locations with a range, probability, and confidence factor.

Figure 14A:
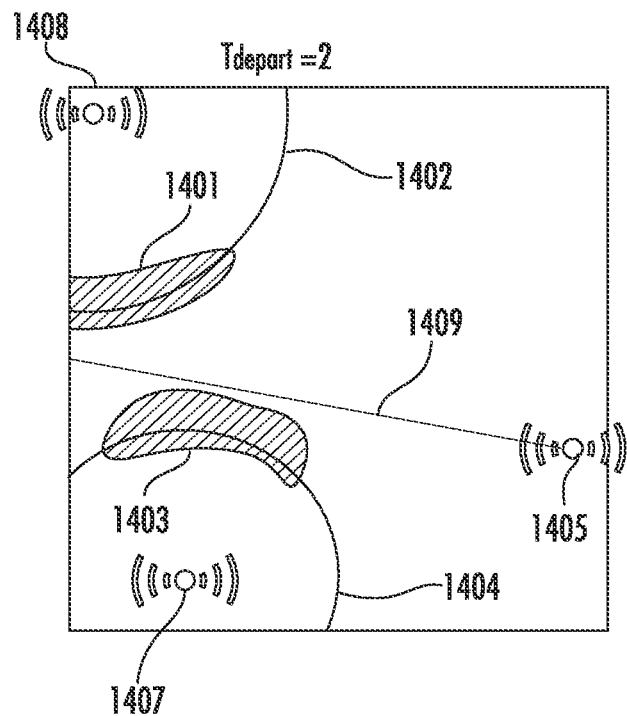
FIGS. 14A and 14B are diagrams illustrating various scenarios of determining location in accordance with some embodiments of the present inventive concept.

In addition to determining location by only doing ranging, or just doing AoA, or just doing time of arrival, it is possible to combine several or all methods within a single solution. Since every tracking device can associate a PDF for each type of raw data it captures, combining different raw data types is no different than using all of the same data types. The product of the spatial probabilities of each sensor produces the final spatial PDF. This is exemplified in FIGS. 14A and 14B. Tracking devices 1408, 1407 and 1405 gather raw location data. Tracking device 1407 obtains a distance measurement to the node (note shown). Tracking device 1405 gets an AoA measurement, and tracking device 1408 receives an arrival time. FIG. 14A shows the spatial PDF at $T_{depart}$=2 time units. The two circles 1402 and 1404 represent the circles with radii as the distances, one being 1404 obtained from the measurement of distance with the node and tracking device 1407, and the other being 1402 calculated based on $T_{depart}$ and the time of arrival measurement. The line 1409 is the AoA measurement from tracking device 1405. Here, there are two areas of high probability, 1401 and 1403.

Figure 14B:
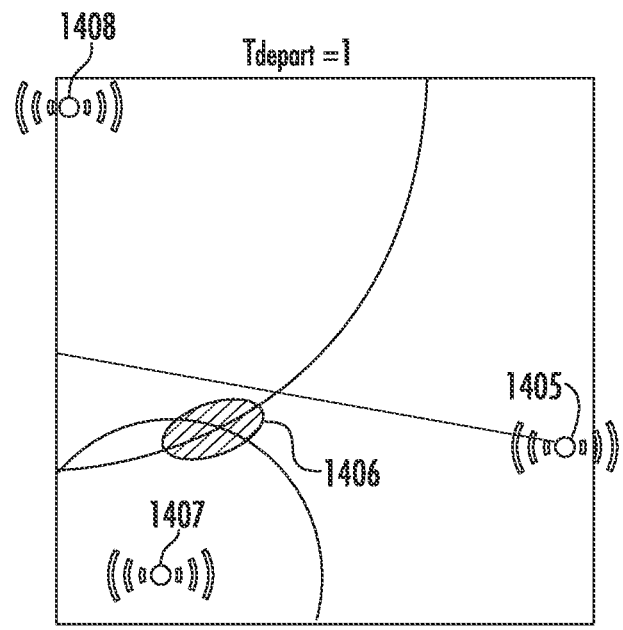

In FIG. 14B, $T_{depart}$=1, and the area of high probability is denoted by 1406. Compared to the two areas of high probability, 1401 and 1403 in FIG. 14A, 1406 represents a probability that is about 30× larger. Qualitatively, the circles and lines in FIG. 14B come closer together, suggesting a larger probability for 1406 as well.

Z-axis probability distribution function will now be discussed in accordance with some embodiments of the present inventive concept. Often times there is a misunderstanding regarding the accuracy of a localization solution. Some may assume that accuracy may be consistent through the system, or that to move to 3D strictly involves amending the location algorithm but does not necessitate relocating of the tracking devices. 2D systems reduce cost by placing tracking devices as far apart as feasible and keeping them relatively high to avoid LOS obstructions. However, this fails to recognize the inherent geometry of the configuration and actually works against accurately measuring z axis height as a result. A simple example showing how a 2D system with antennas placed far apart can yield high accuracy in 2D but suffers in z height accuracy will help illustrate this idea. To demonstrate this, we consider the distance PDF in FIG. 8 applied to the layout 1502 of FIG. 15. Here two tracking devices 1501 and 1503 do ranging with a node (not shown) and take distance measurements 1504 and 1508. The resulting spatial PDF shows an area 1505 of high probability. The image is largely to scale, but given the relatively long length, L, in the x axis of the two tracking devices 1501 and 1503 and the shallow height of the space, H, where L>>H, the area 1505 of high probability of the node is oblong in shape. The range of node values is narrow in the x axis denoted by "Δx". However, the range of possible z values denoted by Δz is relatively large. The result here is born out of the calculation of spatial probability density function. By examining the spread of the area of high probability, one can understand the accuracy of the system in 3D space and how it can differ in each of the x, y and z directions. This knowledge may be used to guide the design and placement of tracking nodes for improved tracking accuracy as will be discussed below.

Estimation of location accuracy of a system using the probability distributions in accordance with some embodiments of the present inventive concept will be discussed. It is not always obvious to the installer of an RTLS the tracking device grid should be set up in a facility to optimize tracking and performance. In some embodiments of the present inventive concept, an RTLS's configuration can be simulated to enhance accuracy performance.

Figure 16:
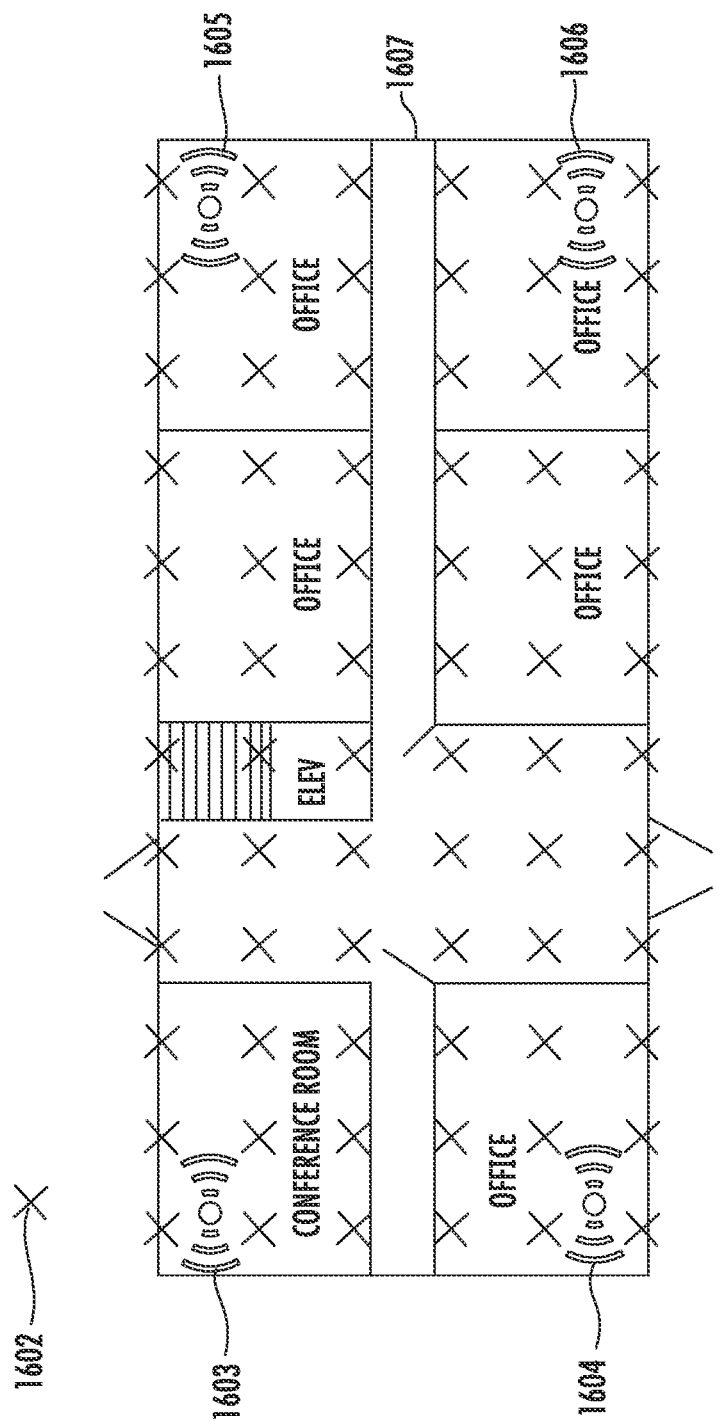
FIG. 16 is a diagram illustrating a floor map in accordance with some embodiments of the present inventive concept.

Consider the first floor map 1607 in FIG. 16. A number of hash symbols 1602 mark the first floor map throughout. Furthermore, tracking devices 1603, 1604, 1605, and 1606 are situated in each of the corners of the map. In some embodiments, a diagnostic system is used to evaluate the tracking accuracy of the system. For each hash mark 1602, the raw location data (ex. distance, AoA, and/or arrival time) of a tracking tag (node) is synthesized. The synthesized data could either be drawn from real data or be created using a model to produce simulated sensor data from the tracking devices. One such model would be that of applying probability distribution functions as discussed above.

In turn, the synthesized data can be fed into the location module to determine the data point. If the location module leverages a spatial PDF type solution, areas of high probability are extracted. As discussed above with respect to FIG. 15, the range (i.e. spread) of the area of high probability equates to the accuracy and precision of the system. This is done at every hash point, producing a function of accuracy over the x, y coordinates of the floor space. Accuracy between hash points can be interpolated based on the accuracy values of the surrounding hash points. In so doing, the system can estimate a level of accuracy anywhere on the map.

Figure 17:
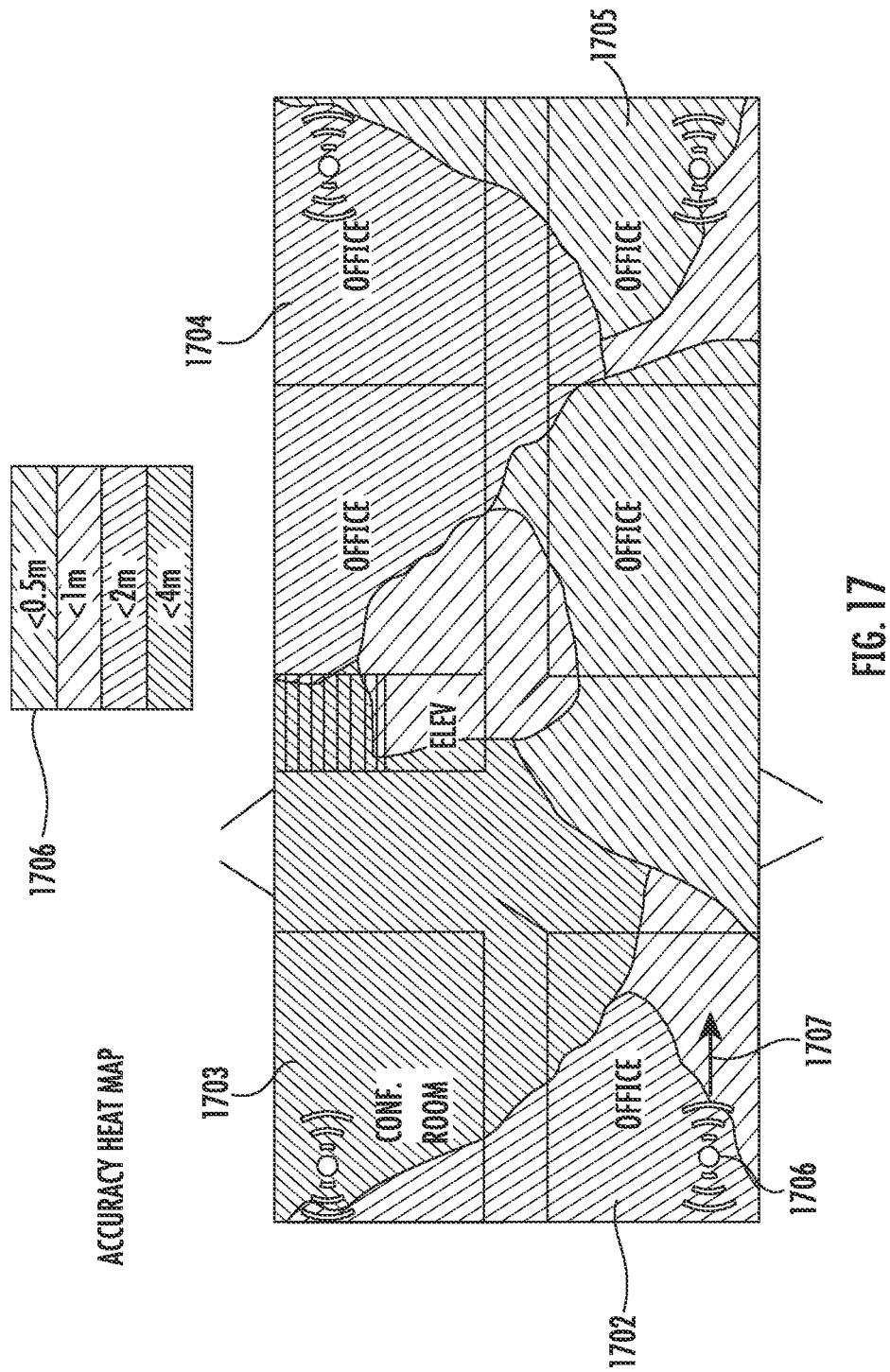
FIG. 17 is a diagram illustrating a heat map in accordance with some embodiments of the present inventive concept.

Visually, there are many ways to represent accuracy on a 2D map. Color, grayscale, numbers, vector maps, etc. are all plausible ways to display such data. In FIG. 17, the accuracy map is shown as a canonical "heat map". Here there are four different colors 1702, 1703, 1705, and 1704 (shading as figures are in black and white/grey scale) ranging in accuracy to less than 0.5 m to less than 4 m. This map is produced as part of the GUI and used as part of the configuration of the system. As a user input tool, this could be visually shown on a computer, and a user could move tracking devices around on the map. As a tracking device 1706 is moved in the direction of 1707, for example, the heat map changes dynamically to show the immediate effects of the new position of the antenna. Once satisfactory tracking device positions are determined this data can be used by the installer of the RTLS to position the devices during installation.

Heat maps can show more than just the accuracy over the space of the facility. For example, a heat map of the confidence factor from real tracking could also be used. Lower confidence factors would indicate a poorly tracking part of the network. Heat maps could also give indications of RF noise or the general health of the network system. For example, if there are a group of antennas in a vicinity that are not communicating over RF very well, the system could identify the area covered by the tracking devices as a color indicating an RF reception problem.

Figure 15:
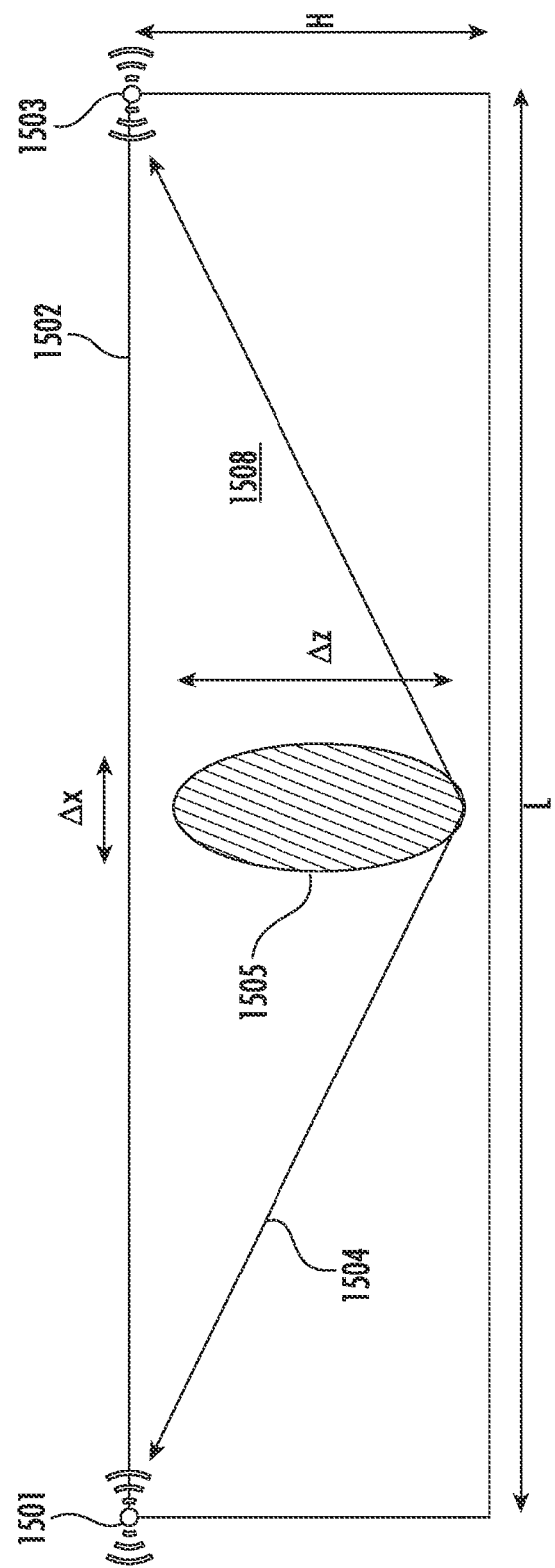
FIG. 15 is a diagram illustrating two antennas used for node location in accordance with some embodiments of the present inventive concept.

Alternatively, the tracking accuracy in just one dimension could be shown in a heat map as well. For example, a heat map could show the accuracy of the z direction. As shown in FIG. 15, placement of the tracking devices can have a dramatic effect on the z axis accuracy.

Figure 18:
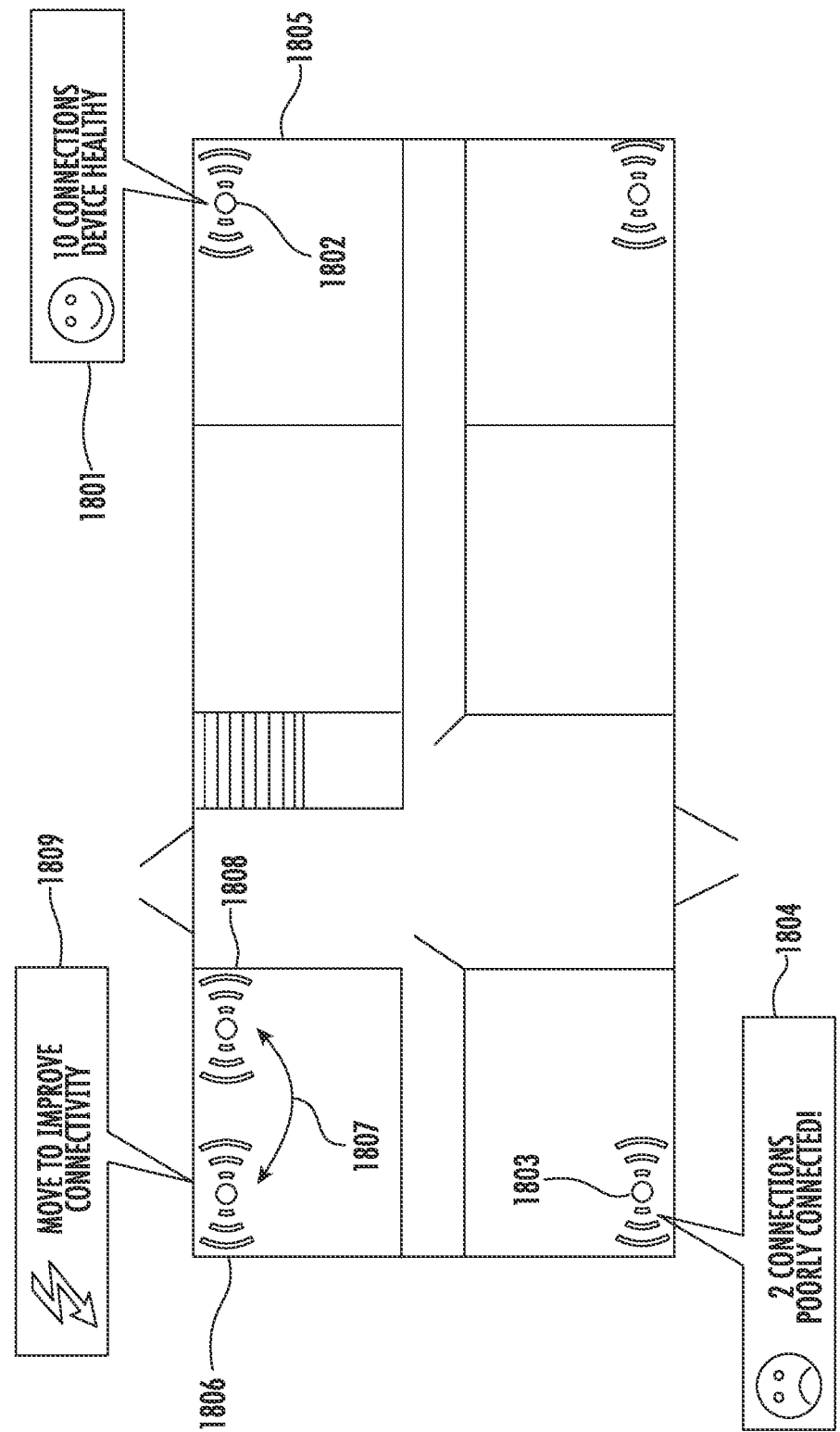
FIG. 18 is a diagram of a floor map in accordance with some embodiments of the present inventive concept.

FIG. 18 illustrates further methods of displaying information of tracking devices on a map. As shown in FIG. 18, tracking devices 1806, 1802 and 1803 in area 1805 have pop-up messages indicating the health of the connections to other tracking devices and/or nodes. Message 1804 uses graphics and text to indicate that there is a poor connection. Message 1801 uses a "smiley face" icon and text to denote a healthy connection. Message 1809 suggests moving antenna device 1806 from its current location to the location of 1808 to improve connectivity.

A combination of messages and heat maps could also aid in configuring tracking devices on a map. For example in FIG. 18, tracking devices are repositioned on the screen from 1806 to 1808, there could be an overlaid heat map that dynamically changes to show the improvement to the system. FIG. 18 is provided as and example only, embodiments of the present inventive concept should not be limited thereto.

Representation of multi-story tracking and calibration in accordance with various embodiments of the present inventive concept will be discussed. With the ability to track nodes on multiple vertical levels (i.e. floors), the challenge remains as to how the user interface interacts with the program to set, calibrate and view both tracking devices and nodes of the system.

Existing user interfaces typically have a single program window where one can display a floorplan image. With multiple floors, either the user should be able to upload an image for each floor or a representation should be able to be established through other means. Furthermore, the user should be able to add properties to each floor which could include:

1) Height of floor from previous floor. This parameter is important during calibration in the situation where tracking devices from one floor to another can communicate to one another. During calibration, tracking devices from nearby floors may be used as part of the tracking mesh for a particular floor.
2) Story number of the floor. This parameter is used simply to order the floors correctly. When a user wishes to display a particular floor, the list of floors could be shown as 1 through 20, for a 20-story building, for example.
3) X,Y reference point. In order to align floors along x and y with one another, some embodiments have a common reference point that is the same for all floors. Namely, if a vertical line is drawn straight through the building, the point at which it intersected with each of the floors would be the reference point. The reference point X, Y would be represented in either the pixels or meters relative to a fixed reference point such as a particular corner of the image. If the floorplan images were in a computer aided design (CAD) or vector format with x and y data (and possibly z) already embedded within them, then the images may already be aligned with one another, and an X, Y reference point may not be necessary.
4) Scale. Each image has a scale that related physical distance (meters or feet) to the number of pixels in the image. Again, if the floorplan images were in CAD or vector format, the scaling may already be embedded within the image.

For each image, as it is loaded, the program stores the image or a reference to its location internally to the configuration file or database.

Figure 19:
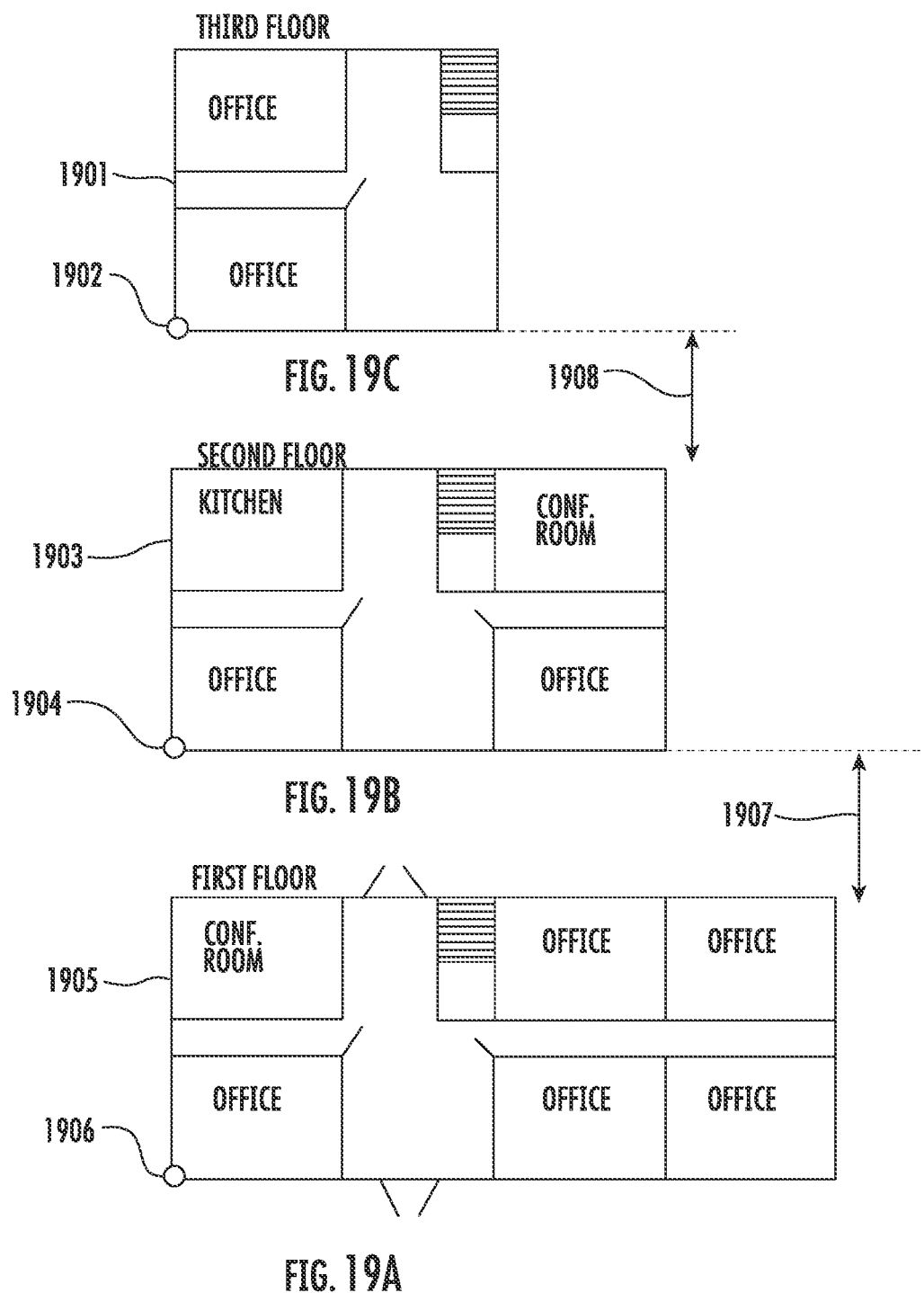
FIGS. 19A through 19C are diagrams of different floors in a multistory building in accordance with some embodiments of the present inventive concept.

Referring now to FIGS. 19A, 19B and 19C, maps 1905, 1903, and 1901, respectively, represent the first through third floors of a building. The reference point is identified on each floor. Here, reference point 1902 is on the third floor, reference point 1904 is on the second, and reference point

1906 is the first floor. From a GUI perspective, the user could, for example, click on a reference point or input the exact x,y values through a dialog box. As opposed to a reference point, a similar concept would be to apply a translation of the map image within the GUI's reference frame. In these embodiments, each image has a unique translation such that the maps become aligned. This is illustrated in FIGS. 19A through 19C when taken as a whole.

Although not discussed explicitly herein, there may even be a need to rotate maps with respect to each other. So in addition to a reference point, there may be an angle associated with each map indicating how much it needs to rotate in the x-y plane in order to be aligned with the other images.

Lastly, the system may need to know the distance between the floors. This distance denoted by 1907 and 1908 allows for the calibration among tracking devices even though they are not necessarily all on the same floor.

Figure 20:
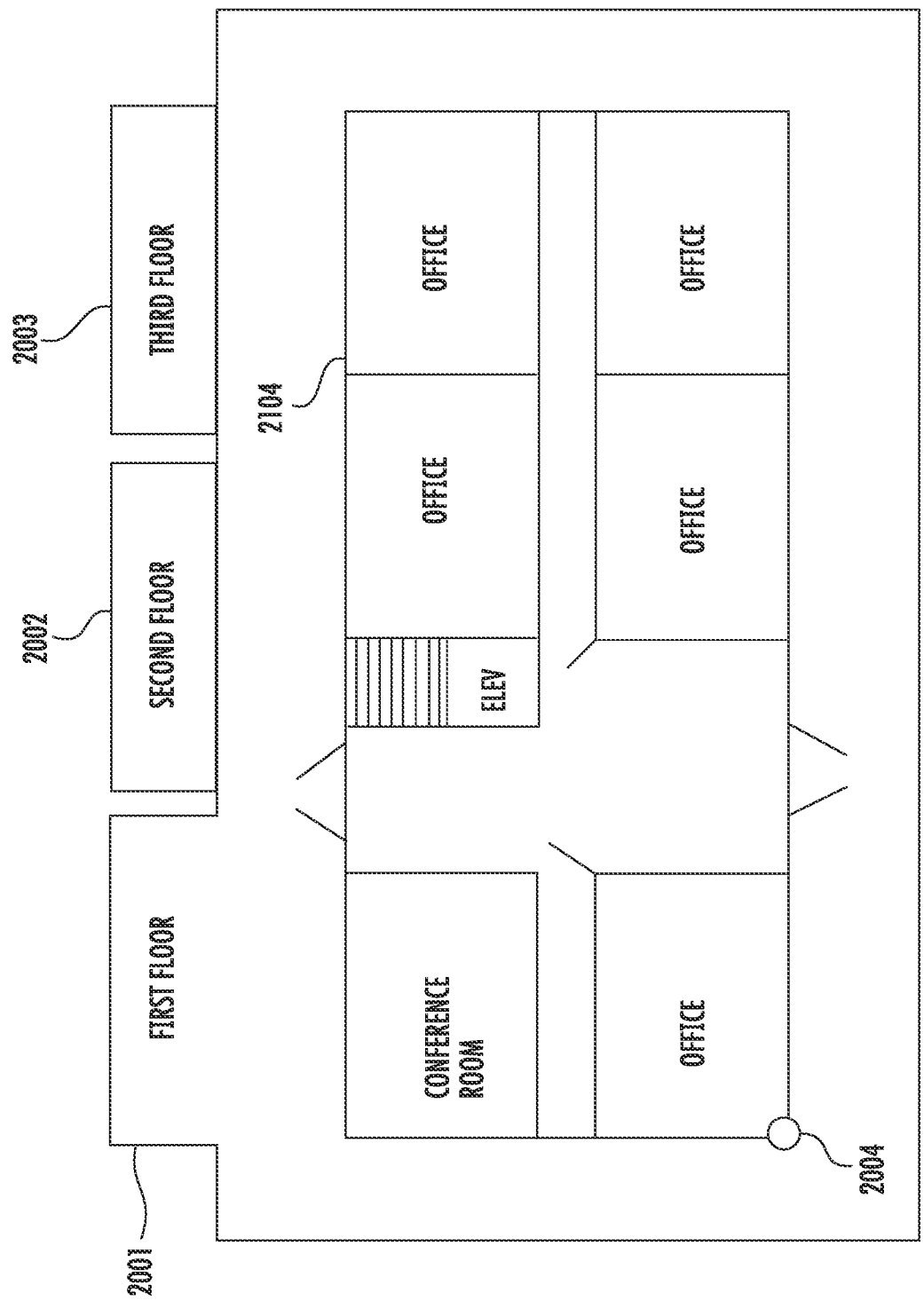
FIG. 20 is a diagram of a graphical user interface for visualizing floors in accordance with some embodiments of the present inventive concept.
Figure 21:
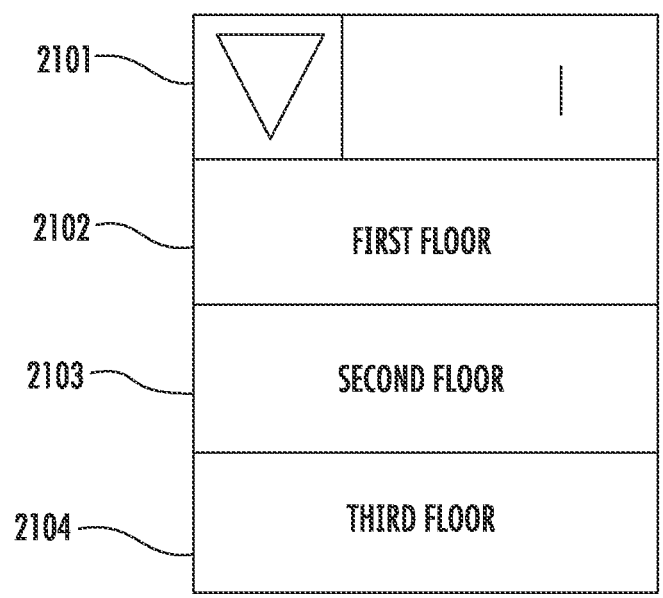
FIG. 21 is a diagram of a graphical user interface for visualizing floor selection in accordance with some embodiments of the present inventive concept.

As a representation in the GUI, the user could select which floor to view using any number of methods. For example, the individual floors could be viewed separately by selecting a tab associated with each floor as illustrated in FIG. 20. As shown, each floor is within a tab (2001, 2002, 2003) and can be viewed by clicking on the desired tab. Reference point 2004 is shown in the lower corner. Alternatively, floors could be displayed by selecting a dropdown menu of the floor list as shown in FIG. 21. In these embodiments, the dropdown menu 2101 could be clicked and the floors could all be displayed. In further embodiments, a list of floors could be docked to an edge of GUI. This list could be represented using text or iconography. In still further embodiments, on touch screens, floors could be easily switched between by swiping up or down (or left/right) with the user's finger. Any method of interacting with a GUI can be used without departing from the scope of the present inventive concept.

Figure 22:
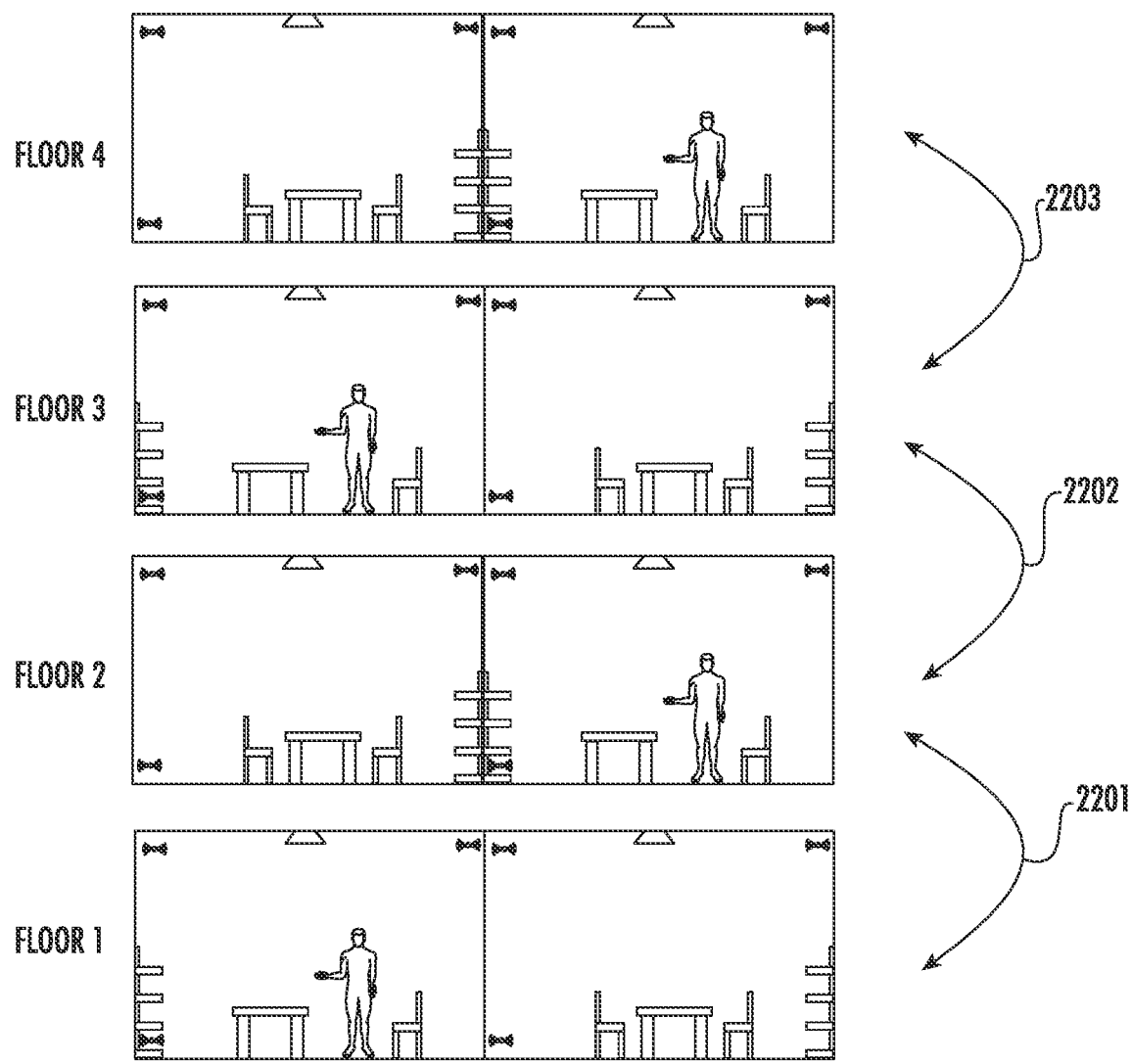
FIG. 22 are diagrams of different floors in a multistory building in accordance with some embodiments of the present inventive concept.

Calibration and tracking of a multi-floor system in accordance with some embodiments of the present inventive concept will be discussed. In some RTLSs, calibration of a single floor involves aligning tracking devices on a computer screen with both a map and other tracking devices. With multi-floor systems, visually, calibration is more difficult as it requires a third viewable dimension. Furthermore, tracking devices on one floor may be able to talk to tracking devices on other floors. Precise placement involves not only aligning to just a single floor, but if alignment is off with antennas on a different floor, the overall system can be degraded. FIG. 22 illustrates a cross section of a map of multiple floors. One possible calibration method allows for both an x,y planar view during calibration along with an x,z vertical view simultaneously. In such a scenario, tracking devices can be more easily seen as they are moved in the correct position. Furthermore, it may be more visually helpful to see graphically antennas communicating (2203, 2202, 2201) on different floors from the x, z perspective.

Further embodiments could have the various floors of the map viewable on top of one another with a semitransparent overlay. Using the known z data as described previously, the system could use simple trigonometry to display 2D representations of the communication between floors. This could be done not just for two floors but however many can simultaneously communicate with a reference floor.

Assigning antennas to floors in accordance with some embodiments of the present inventive concept will be discussed. As a first step in setting up a mesh network within a RTLS program, the system goes through a process of "Discovery" where it finds all the online tracking devices. Simply finding the antennas does not automatically associate the antennas to a given floor. However, some embodiments of the inventive concept assist in associating individual antennas with each floor. If one of the antennas can be identified as pertaining to a specific floor, then through the process of measuring distances (or AoA, time of arrival, etc.) between other antennas, localization can decipher the floor that antennas are on.

Alternatively, tracking devices that may be connected to a common ethernet router, or a gateway device may also be associated with being on the same floor as discussed in, for example, United States Patent Publication No. 2018/0241130A1, the contents of which is hereby incorporated herein by reference as if set forth in its entirety. If a gateway were associated with a particular floor, then all tracking devices connected to the gateway (either directly or through adapters) could also be associated with the floor.

In some embodiments, it may be necessary to show tracking devices from other floors on the current floor map, especially if they are being used to track nodes on that particular floor. To distinguish between these tracking devices, they can be show with different colors or shading to indicate that they are not on the current floor. Height information of antennas could relate to the current floor, and if the antennas are on a different floor, it could be noted when displaying the height information on the user interface of the program.

Alternatively, the images could be displayed in a 3D topographical method. If a 3D CAD image existed for the entire building, this could be viewed three dimensionally as well. In moving tracking devices around, one could partially lock down the tracking device on the screen. Typically, the z height value is fixed, and the x and y values can change as the tracking device is moved around on a screen. However, one could alternatively choose to lock the x and move around the y and z or lock y and move around the x and z.

Figure 23A:
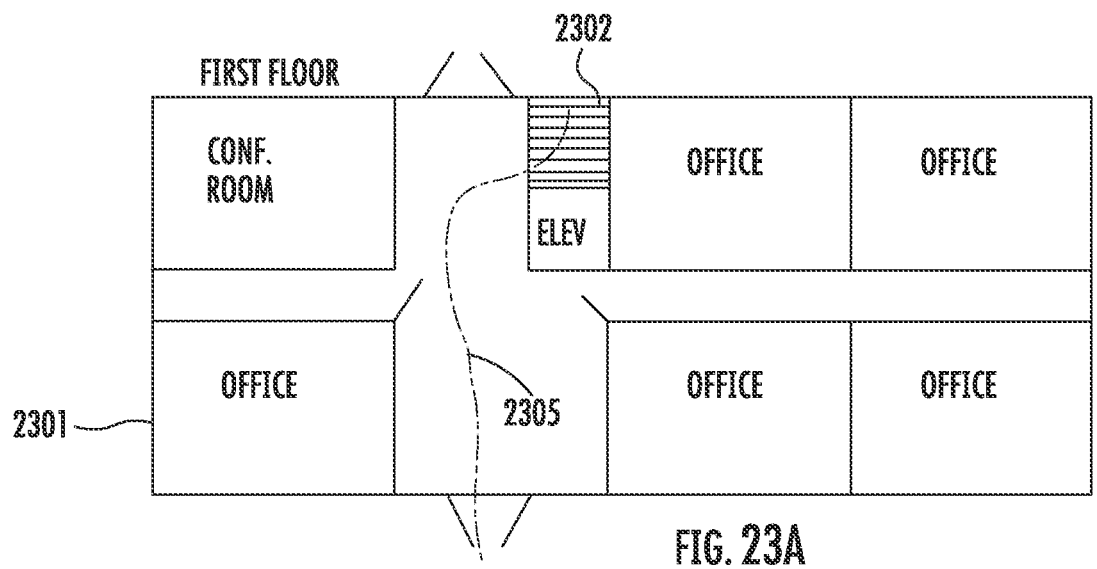
FIGS. 23A and 23B are diagrams of different floors in a multistory building in accordance with some embodiments of the present inventive concept.
Figure 23B:
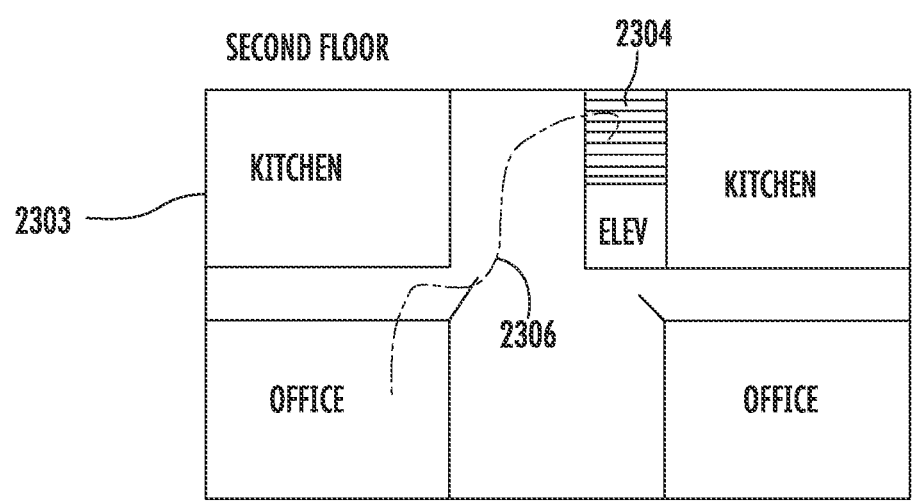

Multi-floor tracking in accordance with some embodiments of the present inventive concept will be discussed. Representing a path tracked with a single floor map is fairly straightforward. Typically, a map is drawn with either a series of dots, dashed or solid lines to indicate the path of a node on a map. It becomes more difficult to denote the path of a node when multiple floors are involved. FIGS. 23A and 23B illustrate and example of how this could be done. The First-floor 2301 shows the path 2305 of a node going from the front door to the stairwell 2302. The transition to the second floor occurs in the stairwell 2304 of the second-floor map 2303. The display of the maps could either occur side by side, or as discussed with respect to FIGS. 20 and 21 they could be displayed using a number of other methods. Alternatively, if the historical data of the node path were being played back visually on the map, the current map where the historical point was located can be displayed, and when the transition between floors happens the display could automatically bring up the next map.

Figure 24:
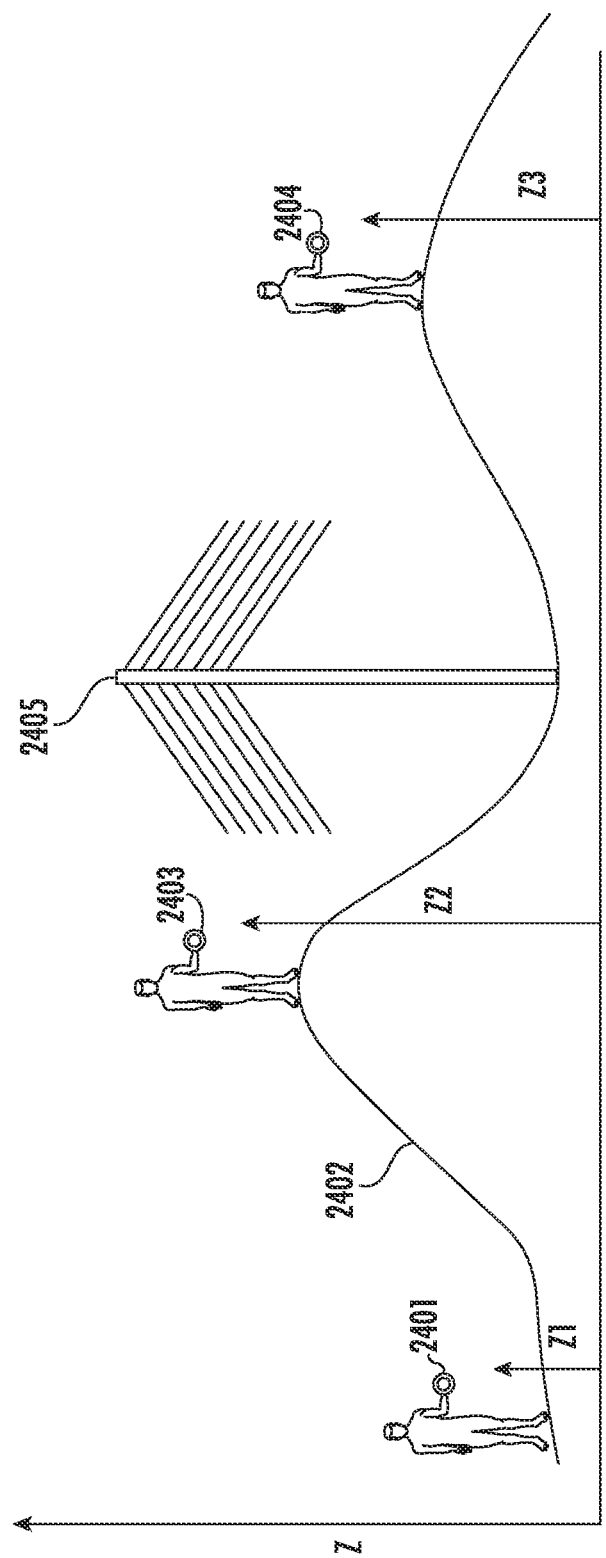
FIG. 24 is a diagram of a topographical map in accordance with some embodiments of the present inventive concept.

3D tracking using a topographical map in accordance with some embodiments of the present inventive concept will be discussed. There has previously been a discussion over different solutions to determine a 3D location of a tag. In this embodiment, the 3D location is determined with the use of a topographical map. In the case where a tagged item is on an object, person, or vehicle that mostly stays close to the ground, the terrain of the surface (i.e. topographical map) can provide the solution to the z height value. Consider the example in the FIG. 24. Here there are three tags, 2401, 2403, and 2404, being held by people. A tree 2405 is shown as being part of the outside environment. As the people move around, the tag height follows the height of the terrain 2402 with an offset of a few feet above the ground. Since the z value is dictated by the location of the x and y position, there are no longer three independent variables to solve. This then reduces to solving for two independent variables. For example, some methods for solving the location are discussed in U.S. Pat. No. 10,462,762, the disclosure of which is hereby incorporated herein by reference as if set forth in its entirety, including gradient descent and point clumping methods. In gradient descent, instead of assuming the solution exists in a flat x-y plane, the iterated solution exists on the curve depicted by the topographical map (plus any height offset). In point clumping, points can be eliminated that do not fall within the tolerance of the terrain height (plus any offset). Topographical map information can be readily available online in some cases. For example, the United States Geological Survey provides height information for most locations in the United States. A software system downloads the topographical information and assimilates the mapping data within the localization module. Alternatively, a formal site survey can include a topographical map scan. In some instance LiDAR or laser scanning is done to obtain high resolution height data. Such topographical map data could be saved in the form of a computer file that is later loaded into the software RTLS.

A topographical map need not be exclusively related to the geographical area itself. In some embodiments, the tags are confined at certain heights based on man-made structures, not geographical ones. For example, consider a manufacturing assembly line. A tag may be affixed to the base frame of a manufactured item. As the frame moves through the assembly line, it may be restricted to not only follow a certain path but also that path may include movement upwards and downwards. In these embodiments, the topographical map provides for limits in z height dependent on x and y. Furthermore, there are limits in where it could be located in x and y as well. As another example, consider a tag connected to the car of a roller coaster. Clearly, the height will change dependent on the location of the car on the roller coaster. As well, the x and y are also restricted further confining the solution to a given narrow path.

3D tracking using a pressure sensor in accordance with some embodiments of the present inventive concept will be discussed. Accurate position in x and y is possible if antennas are placed relatively far apart, but as was previously shown (i.e. FIG. 15), z height resolution can suffer accordingly. Consider the example, where antennas are placed 1.0 kilometer apart. Z height accuracy could be off by as much as 60 meters in these cases. Simply relying on the raw RF data obtained from typical UWB systems (i.e. ToF, AoA, and RF arrival timestamps) may not be enough to get reasonable accuracy in z height. Off the shelf pressure sensors have the ability to detect changes in pressures as little as 0.1 hPa. With every 8 meters of height increase there is corresponding 1 hPa reduction in pressure. Therefore, sensors with sensitivity of 0.1 hPa can detect height differences below 1 meter in resolution. Given that weather changes pressure on a daily if not hourly basis, it may be difficult to simply rely on the absolute pressure measurement from a pressure sensor directly, however, air pressure typically stays fairly constant over a few kilometers. A single pressure sensor in the area being tracked may provide enough data to accurately provide differences in pressure, and therefore, to determine the height of a tag.

Figure 25:
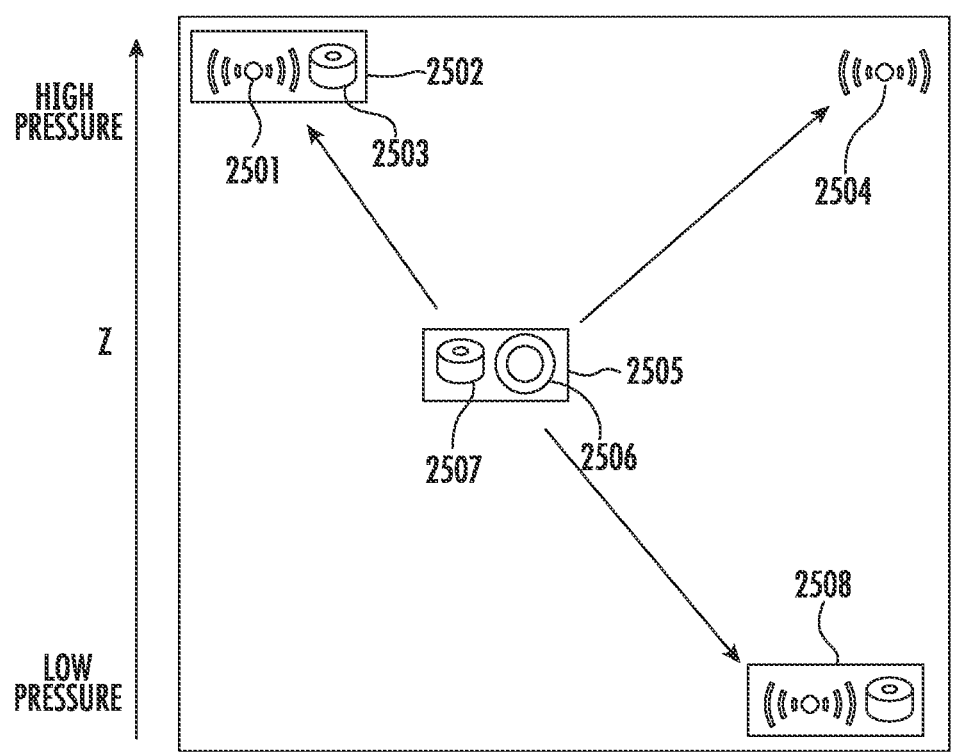
FIG. 25 is a diagram of a tracking system using pressure systems in accordance with some of the embodiments of the present inventive concept.

Consider the RTLS network in FIG. 25. Here, anchor devices include pressure sensors as an additional means of determining height. Anchor device 2502 contains both a pressure sensor 2503 and a RF antenna device 2501. Anchor device 2508 also contains a pressure sensor and RF antenna. However, anchor device 2504 is only an antenna device and contains no pressure sensor. The tag device 2505 consists of an RF beacon device 2506 and a pressure sensor 2507. The tag periodically sends a RF beacon message. The beacon message includes a measurement from the pressure sensor. Like before, the beacon message is received by the anchor devices, 2504, 2502, and 2508. Additional communication could occur with the tag device 2505 to employ the various methods of obtaining RF raw location data. For example, ToF measurements, AoA, and timestamps could be used. In addition to the RF raw location data, the system further measures the pressure at the anchor devices, 2502 and 2508 in addition to obtaining the pressure from the beacon messages of the tag device 2507. The localization module then takes both the RF raw data measurements and the pressure measurements (both from the tag and the anchor devices) to solve for the x,y and z location of the tag. In some embodiments, solving for x,y, and z location, the module could initially use the pressure sensor data from tags and anchor devices to solve for the height of the tag. Since the height of the anchor devices is known already, the pressure differences between the tag and anchor devices could be converted into height differences. With more than one pressure reading from the anchor devices, the system could do some sort of statistical averaging to determine the height of the tag. With the height of the tag known, the module simply employs a 2D method to solving for the x and y location of the tag.

In other methods for solving for 3D location with pressure sensor, a combined algorithm including both pressure sensor and RF raw data could produce a more refined x,y, and z location. Referring to the probability distribution function for determining location, one could also create a PDF for pressure and consequently, that PDF could be converted into a spatial or volume PDF for location determination.

Outdoors, this method could work with antennas spaced for apart. Indoors, care should be taken to account for the added pressure that HVAC systems may put into the environment. Large warehouse type facilities may see negligible effects from HVAC systems. Especially, if there are a large number of anchor devices with pressure sensors, the system could use the pressure sensor information to detect any sort of pressure gradients across the facility. For shorter ceiling facilities with multiple floors, it may not be possible to correlate a pressure from one floor to the other. In these embodiments, the calculation of the height should only be based on the pressure readings from the floors the tags reside on.

Floor determination using pressure measurements from tags will be discussed. As referred to in FIG. 6, methods were described to determine which floor of a building a tag resided on. In some embodiments, the pressure measurement from a tag could aid in the determination of the floor it resides on. Pressure sensors could reside on each floor. Alternatively, multiple pressure sensors could reside on each floor and be integrated with the antenna devices similar in layout to FIG. 25. With one or more pressure measurements from anchor devices and with one or more pressure measurements from the tag, the module could correlate similarities in pressure readings of the tag with those of the anchor devices to determine the floor in which it resides. In some embodiments, the HVAC system creates a pressure level that is distinctly different between floors. In other embodiments, the height between floor creates enough of a pressure difference to distinguish it between the floors.

Pressure sensors used in topographical maps as part of location determination will be discussed. Pressure sensing can be combined with knowledge of the terrain for improved results. With both a topographical map and pressure sensor readings, a location module could use both sets of information for overall better positioning. The reverse could also be true. A topographical map could be created from the 3D tag tracking of an environment itself. As tags traverse an environment with an unknown topography, the 3D module can record the height of the tags based on the x and y position to create the topographical map. Pressure sensors on tags could be used as described in FIG. 24, but any method for determining 3D positions could also be employed.

Figure 26:
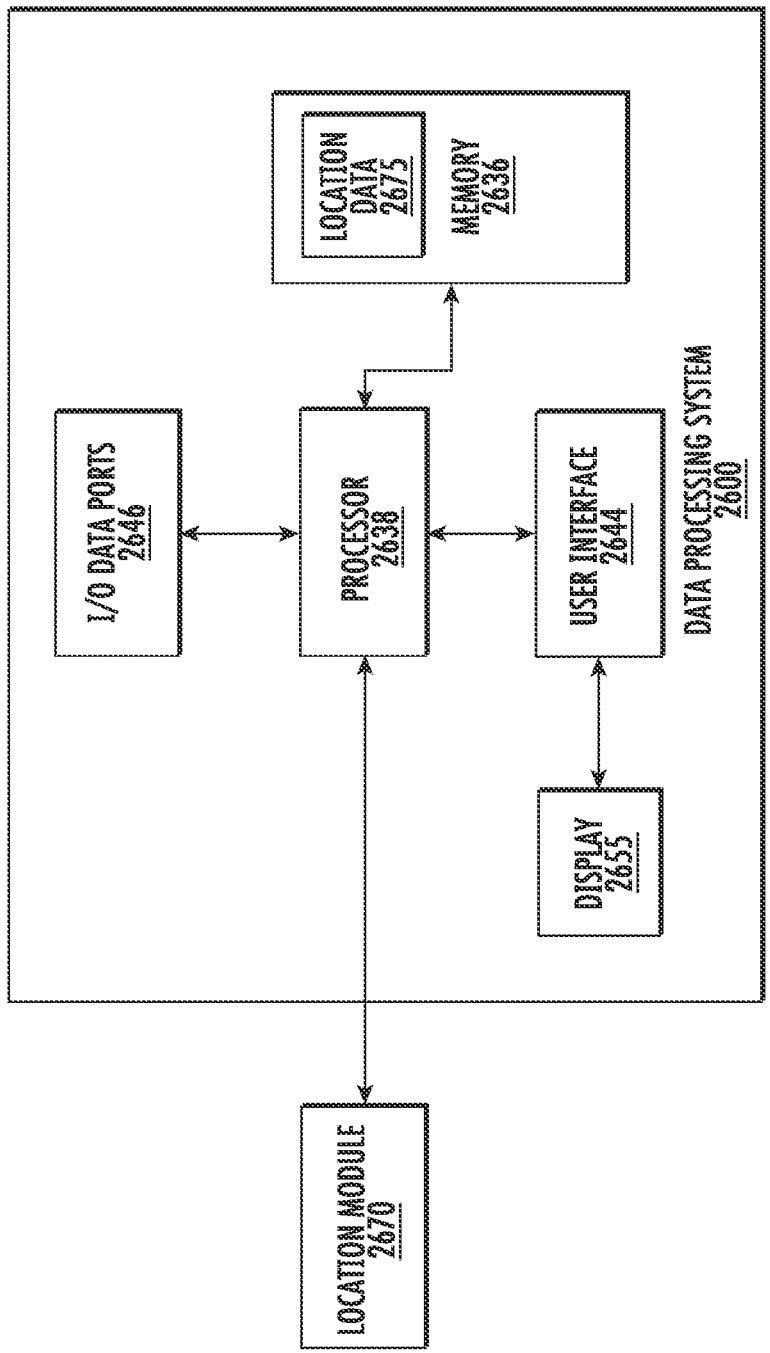
FIG. 26 is a block diagram of a data processing system that may be used in accordance with some embodiments of the present inventive concept.

Embodiments of the present inventive concept manipulate data to calculate various parameters. Accordingly, some sort of data processing is needed to create and store the data. FIG. 26 is a block diagram of an example of a data processing system 2600 suitable for use in the systems in accordance with embodiments of the present inventive concept. For example, a location module 2670 discussed throughout the specification may interact with the data processing system 2600 or be part of the data processing system 2600 without departing from the scope the present inventive concept. The data processing may take place in any of the devices (or all of the devices) in the system without departing from the scope of the present inventive concept. As illustrated in FIG. 26, the data processing system 2600 includes a user interface 2644 such as a keyboard, keypad, touchpad, voice activation circuit or the like that interacts with a display 2655 illustrating a graphical user interface (GUI), I/O data ports 2646 and a memory 2636 that communicates with a processor 2638. The I/O data ports 2646 can be used to transfer information between the data processing system 2600 and another computer system or a network. These components may be conventional components, such as those used in many conventional data processing systems, which may be configured to operate as described herein.

In some embodiments, the data processing system 2600 can be any suitable computing device for performing operations according to the embodiments discussed herein described herein. The processor 2638 can include one or more commercially available processors, embedded processors, secure processors, microprocessors, dual microprocessors, multi-core processors, other multi-processor architectures, another suitable processing device, or any combination of these. The memory 1036, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 2600.

I/O components 2646 may be used to facilitate wired or wireless connections to devices such as one or more displays, game controllers, keyboards, mice, joysticks, cameras, buttons, speakers, microphones and/or other hardware used to input or output data. Memory 2636 represents nonvolatile storages such as magnetic, optical, or other storage media included in the data processing system and/or coupled to processor 2638. As shown, the memory 2636 may include the location data 2675 for various of the embodiments discussed above. The user interface 2644 may interact with the display 2655 such that various of the embodiments discussed above can be manipulated using a graphical user interface on the display 2655.

It should be appreciated that data processing system 2600 may also include additional processors, additional storage, and a computer-readable medium (not shown). The processor(s) 2638 may execute additional computer-executable program instructions stored in memory 2636. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xcon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A real time location system (RTLS) for determining three-dimensional locations of nodes in an environment, the RTLS comprising:

at least one node associated with an asset in the environment, the at least one node having an unknown location;

at least one tracking device that communicates with the at least one node to obtain location data associated with the unknown location of the at least one node; and a location module that receives, from the tracking device, the location data associated with the unknown location of the at least one node and determines a real-time three-dimensional current location of the at least one node based on the location data, the real-time three-dimensional current location having x, y and z coordinates and the z coordinate indicates a height of the at least one node in the environment, wherein the location module further:

creates a list of heights (z) for the at least one node;

performs a binary search of the list of heights (z);

selects two heights (z) from the list of heights (z), one of the two heights (z) being a low height and one of the two heights being a high height;

determines a middle height between the low and high heights;

calculates x and y coordinates for each of the low, middle and high heights;

calculates an error factor for each of the calculated x and y coordinates;

selects a new pair of low and high heights based on where the calculates error factor fall between the low and middle heights or between the middle and high heights; and repeating the determining, the calculating x and y coordinates, the calculating the error factor and the selecting the new pair of low and high heights until a final height of the at least one node is determined;

wherein the environment is a multi-story building;

wherein the at least one tracking device comprises at least one tracking device on each floor of the multi-story building and the at least one tracking device transmits and receives data; and wherein the at least one tracking device on each floor operates independently of the at least one tracking device on all other floors.

2. The RTLS of claim 1, wherein the location module further: receives a plurality of heights (z) in the environment; and calculates x and y coordinates for each of the plurality of heights (z) to provide x, y and z coordinates for each of the plurality of heights (z).

3. The RTLS of claim 2, wherein the location module further:

calculates a confidence factor for each x, y and z coordinate; and selects a height for the at least one node based on the calculated confidence factors, wherein the height with a greatest confidence factor is selected.

4. The RTLS of claim 2, wherein the location module further:

calculates an error factor for x, y and z coordinate; and selects a height for the at least one node based on the calculated error factors, wherein the height with a smallest error factor is selected.

5. The RTLS of claim 4, wherein the location module further calculates the error factor for each x, y, z coordinate using a difference between measured distances and presumed distances related to the at least one node.

6. The RTLS of claim 1, wherein the location data comprises angle of arrival data, time of flight measurement data, arrival timestamp data and/or departure timestamp data.

7. The RTLS of claim 1, wherein the RTLS comprises a ultra-wideband (UWB) system.

8. The RTLS of claim 1, wherein the at least one tracking device comprises a plurality of tracking devices and wherein the plurality of tracking devices on a same floor communicate between one another.

9. A real time location system (RTLS) for determining three-dimensional locations of nodes in an environment, the RTLS comprising:
   at least one node associated with an asset in the environment, the at least one node having an unknown location;
   at least one tracking device that communicates with the at least one node to obtain location data associated with the unknown location of the at least one node; and
   a location module that receives the location data associated with the unknown location of the at least one node and determines a real-time three-dimensional current location of the at least one node based on the location data, the real-time three-dimensional current location having x, y and z coordinates and the z coordinate indicates a height of the at least one node in the environment,
   wherein the location module further:
   assumes a starting height (z) of the at least one node;
   calculates x and y coordinates of the at least one node based on the assumed starting height (z);
   calculate an error factor based on the assumed starting height (z);
   selects a next height (z) using a gradient descent method; and
   repeating the calculating x and y coordinates, the calculating the error factor and the selecting the next height (z) until a final height of the at least one node is determined.

10. A method for determining three-dimensional locations of nodes in an environment using a real time location system (RTLS), the RTLS including at least one node associated with an asset in the environment, the at least one node having an unknown location; at least one tracking device that communicates with the at least one node to obtain location data associated with the unknown location of the at least one node; and a location module, the method comprising:
   receiving, from the tracking device, the location data associated with the unknown location of the at least one node at the location module; and
   determining a real-time three-dimensional current location of the at least one node based on the location data, the real-time three-dimensional current location having x, y and z coordinates and the z coordinate indicates a height of the at least one node in the environment,
   wherein the environment is a multi-story building;
   wherein the at least one tracking device comprises at least one tracking device on each floor of the multi-story building and the at least one tracking device transmits and receives data;
   wherein the at least one tracking device on each floor operates independently of the at least one tracking device on all other floors, wherein the method further comprises:
   assuming a starting height (z) of the at least one node;
   calculating x and y coordinates of the at least one node based on the assumed starting height (z);
   calculating an error factor based on the assumed starting height (z);
   selecting a next height (z) using a gradient descent method; and
   repeating the calculating x and y coordinates, the calculating the error factor and the selecting the next height (z) until a final height of the at least one node is determined.

11. The method of claim 10, further comprising: receiving a plurality of heights (z) in the environment; and
   calculating x and y coordinates for each of the plurality of heights (z) to provide x, y and z coordinates for each of the plurality of heights (z).

12. The method of claim 11, further comprising:
   calculating a confidence factor for each x, y and z coordinate; and
   selecting a height for the at least one node based on the calculated confidence factors, wherein the height with a greatest confidence factor is selected.

13. The method of claim 11, further comprising:
   calculating an error factor for x, y and z coordinate; and
   selecting a height for the at least one node based on the calculated error factors, wherein the height with a smallest error factor is selected.

14. The method of claim 13, further comprising calculating the error factor for each x, y, z coordinate using a difference between measured distances and presumed distances related to the at least one node.

15. The method of claim 10, wherein the location data comprises angle of arrival data, time of flight measurement data, arrival timestamp data and/or departure timestamp data.

16. A method for determining three-dimensional locations of nodes in an environment using a real time location system (RTLS), the RTLS including at least one node associated with an asset in the environment, the at least one node having an unknown location; at least one tracking device that communicates with the at least one node to obtain location data associated with the unknown location of the at least one node; and a location module, the method comprising:
   receiving, from the tracking device, the location data associated with the unknown location of the at least one node at the location module; and
   determining a real-time three-dimensional current location of the at least one node based on the location data, the real-time three-dimensional current location having x, y and z coordinates and the z coordinate indicates a height of the at least one node in the environment,
   wherein the environment is a multi-story building;
   wherein the at least one tracking device comprises at least one tracking device on each floor of the multi-story building and the at least one tracking device transmits and receives data;
   wherein the at least one tracking device on each floor operates independently of the at least one tracking device on all other floors, wherein the method further comprises:
   creating a list of heights (z) for the at least one node;
   selecting two heights (z) from the list of heights (z), one of the two heights (z) being a low height and one of the two heights being a high height;
   determining a middle height between the low and high heights;

calculating x and y coordinates for each of the low, middle and high heights;

calculating an error factors for each of the calculated x and y coordinates;

selecting a new pair of low and high heights based on where the calculates error factors fall between the low and middle heights or between the middle and high heights; and repeating the determining, the calculating x and y coordinates, the calculating the error factor and the selecting the new pair of low and high heights until a final height of the at least one node is determined.

17. A computer program product for determining three-dimensional locations of nodes in an environment using a real time location system (RTLS), the RTLS including at least one node associated with an asset in the environment, the at least one node having an unknown location; at least one tracking device that communicates with the at least one node to obtain location data associated with the unknown location of the at least one node; and a location module, the computer program product comprising:

a non-transitory computer readable storage medium having computer readable program code embodied in the medium, the computer readable program code comprising:

computer readable program code that receives, from the tracking device, the location data associated with the unknown location of the at least one node at the location module; and computer readable program code that determines a real-time three-dimensional current location of the at least one node based on the location data, the real-time three-dimensional current location having x, y and z coordinates and the z coordinate indicates a height of the at least one node in the environment, wherein the environment is a multi-story building;

wherein the at least one tracking device comprises at least one tracking device on each floor of the multi-story building and the at least one tracking device transmits and receives data; and wherein the at least one tracking device on each floor operates independently of the at least one tracking device on all other floors, wherein the computer program product further comprises computer readable program code that:

assumes a starting height (z) of the at least one node;

calculates x and y coordinates of the at least one node based on the assumed starting height (z);

calculate an error factor based on the assumed starting height (z);

selects a next height (z) using a gradient descent method; and repeats the calculating x and y coordinates, the calculating the error factor and the selecting the next height (z) until a final height of the at least one node is determined.

* * * * *